(12) United States Patent
Kling et al.

(10) Patent No.: US 7,308,651 B2
(45) Date of Patent: Dec. 11, 2007

(54) DATA ENTRY GRAPHICAL USER INTERFACE

(75) Inventors: Åsa Kling, Mölndal (SE); Björn Svensson, Mölnlycke (SE)

(73) Assignee: SCA Hygiene Products AB, Gothenborg (SE)

( * ) Notice: Subject to any disclaimer, the term of this patent is extended or adjusted under 35 U.S.C. 154(b) by 301 days.

(21) Appl. No.: 09/945,626

(22) Filed: Sep. 5, 2001

(65) Prior Publication Data

US 2003/0043195 A1   Mar. 6, 2003

(51) Int. Cl.
*G06F 17/00* (2006.01)

(52) U.S. Cl. ............... 715/709; 715/705; 715/708; 715/713; 715/714

(58) Field of Classification Search ............. 705/26, 705/27, 28, 29, 3; 345/705, 708, 709, 713, 345/714, 710, 771; 715/705, 708, 709, 713, 715/714
See application file for complete search history.

(56) References Cited

U.S. PATENT DOCUMENTS

| | | | | |
|---|---|---|---|---|
| 5,375,199 A | * | 12/1994 | Harrow et al. | 345/771 |
| 5,615,109 A | * | 3/1997 | Eder | 705/8 |
| 5,664,110 A | * | 9/1997 | Green et al. | 705/26 |
| 5,758,095 A | * | 5/1998 | Albaum et al. | 705/2 |
| 6,101,489 A | * | 8/2000 | Lannert et al. | 706/45 |
| 6,249,773 B1 | * | 6/2001 | Allard et al. | 705/26 |
| 6,446,045 B1 | * | 9/2002 | Stone et al. | 705/26 |
| 6,642,946 B1 | * | 11/2003 | Janes et al. | 345/854 |
| 6,862,585 B2 | * | 3/2005 | Planalp et al. | 707/1 |
| 6,868,389 B1 | * | 3/2005 | Wilkins et al. | 705/10 |
| 2001/0032128 A1 | * | 10/2001 | Kepecs | 705/14 |
| 2002/0169665 A1 | * | 11/2002 | Hughes et al. | 705/14 |
| 2002/0188551 A1 | * | 12/2002 | Grove et al. | 705/37 |

FOREIGN PATENT DOCUMENTS

| | | |
|---|---|---|
| CN | 1096118 A | 12/1994 |
| RU | 2161819 C2 | 4/1996 |
| TW | 373142 | 11/1999 |
| WO | WO96/34357 | 10/1996 |
| WO | WO-0035140 | 6/2000 |

* cited by examiner

*Primary Examiner*—Kristine Kincaid
*Assistant Examiner*—Peng Ke
(74) *Attorney, Agent, or Firm*—Birch, Stewart, Kolasch & Birch, LLP

(57) ABSTRACT

Described is a data entry graphical user interface (GUI) system for facilitating entry of incontinence product information by a consumer. The data entry GUI system includes several layered interfaces that may be accessed in sequence and/or at discretion by a user. Each of the layered interfaces facilitates entry of specific incontinence product information for storage in a manufacture database. The entered information may be used to fulfill product acquisition requests, forecast future use of incontinence products, or provide simulation data relating to incontinence product use.

25 Claims, 27 Drawing Sheets

FIG. 2

TENA e-INDEX

| File | Help |

TENA

| INSTITUTION | GROUP | DATA ENTRY | SIMULATION | LOG OFF |

CONTACT US

CONSUMPTION
COLTSFOOT HOSPITAL (WARD 1)
REGISTRATION PERIOD 10-08-2000 - 06-12-2000 — 12

CONSUMPTION | BUDGET | PERSONNEL COST FACTORS — 26

| PRODUCT | | BOX | BAG | PCS. | TOT PTS. | PREVIOUS PERIOD |
|---|---|---|---|---|---|---|
| TENA FOR MEN EXTRA | 30 → 750730 | 2 | 1 | 3 | 237 | 0 |
| TENA COMFORT MINI | 757735 | 0 | 0 | 0 | 0 | 0 |
| TENA COMFORT PLUS | 752850 | 0 | 0 | 0 | 0 | 0 |
| TENA COMFORT EXTRA | 752950 | 0 | 0 | 0 | 0 | 0 |
| TENS COMFORT SUPER | 758053 | 3 | 1 | 5 | 215 | 80 |
| TENA COMFORT MAXI | 31 → 759055 | 0 | 0 | 0 | 0 | 0 |
| TENA SLIP PLUS MEDIUM 2X30 | 710230 | 0 | 0 | 0 | 0 | 0 |
| TENA SLIP PLUS LARGE 2X30 | 710330 | 0 | 0 | 0 | 0 | 0 |
| TENA SLIP SUPER MEDIUM | 711200 | 0 | 0 | 0 | 0 | 0 |
| TENA SLIP SUPER LARGE | 711300 | 1 | 1 | 15 | 249 | 0 |
| TENA SLIP MAXI MEDIUM | 712200 | 0 | 0 | 0 | 0 | 0 |
| TENA SLIP MAXI LARGE | 712300 | 4 | 0 | 0 | 0 | 0 |
| MINI PAD PLUS | 750250 | 0 | 0 | 0 | 0 | 0 |
| MIDI PLUS PAD | 750300 | 0 | 0 | 0 | 0 | 0 |
| MAXI PLUS PAD | 750500 | 0 | 0 | 0 | 0 | 0 |
| TENA UNDERPAD SUPER 95G 60X60 | 771210 | 0 | 0 | 0 | 0 | 0 |

32  34  36  28  38
TOTAL PCS. INCREASES PREV. PERIOD — 39

FIG. 5

TENA e-INDEX

File | Help

TENA e-INDEX

INSTITUTION | GROUP | DATA ENTRY — 12 | ENVIRONMENT | ORDER | SIMULATION | LOG OFF — 22

CONTACT US — 24

CONSUMPTION | BUDGET | PERSONNEL COST FACTORS — 54

DATA CONFIRMATION

COLTSFOOT HOSPITAL (WARD 1)
REGISTRATION PERIOD: 10-08-2000 - 06-12-2000

RESIDENTS

| TYPE OF RESIDENTS | NO. OF RESIDENTS |
|---|---|
| INCO | 20 |

CONSUMPTION

| PRODUCT | ARTNO | BOX | BAG | PCS | TOT PCS |
|---|---|---|---|---|---|
| TENA FOR MEN EXTRA | 750730 | 1 | 0 | 0 | 108 |
| TENA COMFORT MINI | 757735 | 0 | 5 | 0 | 150 |
| TENA COMFORT PLUS | 752850 | 2 | 0 | 10 | 194 |
| TENA COMFORT EXTRA | 752950 | 0 | 0 | 120 | 120 |
| TENA SLIP SUPER LARGE | 711300 | 1 | 1 | 0 | 84 |
| TENA SLIP MAXI MEDIUM | 712200 | 0 | 5 | 10 | 140 |
| TENA SLIP MAXI LARGE | 712300 | 2 | 3 | 10 | 192 |

— 56

| KEYFIGURES | REPORTED PERIOD | PREVIOUS PERIOD |
|---|---|---|
| COST | 180 £ | 195 £ |
| CHANGE RATE | 1.3 | 1.3 |
| COST/RES/DAY | 0.4 | 0.5 |

— 57

<<CHANGE REGISTRATION — 58 | DELETE REG. DATA — 60 | CONFIRM REG. DATA — 62

FIG. 8

| PRODUCT | ARTNO | BOX | TOT PCS. |
|---|---|---|---|
| TENA FOR MEN EXTRA | 750730 | 2 | 216 |
| TENA COMFORT PLUS | 752850 | 3 | 276 |
| TENA COMFORT EXTRA | 752950 | 4 | 320 |
| TENA COMFORT SUPER | 758053 | 3 | 180 |
| TENA COMFORT MAXI | 759055 | 4 | 192 |
| TENA SLIP PLUS MEDIUM 2X30 | 710230 | 4 | 240 |
| TENA SLIP PLUS LARGE 2X30 | 710330 | 5 | 300 |
| TENA SLIP SUPER MEDIUM | 711200 | 4 | 224 |
| TENA SLIP SUPER LARGE | 711300 | 5 | 280 |
| TENA SLIP MAXI LARGE | 712300 | 4 | 208 |
| TENA UNDERPAD SUPER 95G 60X60 | 771210 | 4 | 400 |

FIG. 9

TENA e-INDEX
File Help

TENA

TENA e-INDEX —10

INSTITUTION | GROUP | DATA ENTRY | ENVIRONMENT | ORDER — 22 | SIMULATION | LOG OFF    CONTACT US —24

ORDER PROPOSAL | STANDING ORDER | REPLENISHMENT
                 104

DATE:2001-05-23
FACILITY            NEXT ORDER DATE: 2001-06-01   108
COLTSFOOT HOSPITAL ▽  106 CHANGE NEXT ORDER DATE:

| PRODUCT | ARTNO | BOX | TOT PCS |
|---|---|---|---|
| TENA FOR MEN EXTRA | 750730 | 2 | 216 |
| TENA COMFORT PLUS | 752850 | 3 | 276 |
| TENA COMFORT EXTRA | 752950 | 4 | 320 |
| TENA COMFORT SUPER | 758053 | 3 | 180 |
| TENA COMFORT MAXI | 759055 | 4 | 192 |
| TENA SLIP PLUS MEDIUM 2X30 | 710230 | 4 | 240 |
| TENA SLIP PLUS LARGE 2X30 | 710330 | 5 | 300 |
| TENA SLIP SUPER MEDIUM | 711200 | 4 | 224 |
| TENA SLIP SUPER LARGE | 711300 | 5 | 280 |
| TENA SLIP MAXI LARGE | 712300 | 4 | 208 |
| TENA UNDERPAD SUPER 95G 60X60 | 771210 | 4 | 400 |

CHANGES NO. OF BOXES —110

112            114 SEND TO SCA ORDER SYSTEM          DELIVERY PLAN —116

FIG. 10

TENA e-INDEX

INSTITUTION | GROUP | DATA ENTRY | ENVIRONMENT | ORDER | SIMULATION | LOG OFF

ORDER PROPOSAL | STANDING ORDER | REPLENISHMENT

CONTACT US — 118

DATE: 2001-05-23
FACILITY
COLTSFOOT HOSPITAL

NEXT ORDER DATE: 2001-06-01
CHANGE NEXT ORDER DATE:

| PRODUCT | ARTNO | BOX | TOT PCS |
|---|---|---|---|
| TENA FOR MEN EXTRA | 750730 | 2 | 216 |
| TENA COMFORT PLUS | 752850 | 3 | 276 |
| TENA COMFORT EXTRA | 752950 | 4 | 320 |
| TENA COMFORT SUPER | 758053 | 3 | 180 |
| TENA COMFORT MAXI | 759055 | 4 | 192 |
| TENA SLIP PLUS MEDIUM 2X30 | 710230 | 4 | 240 |
| TENA SLIP PLUS LARGE 2X30 | 710330 | 5 | 300 |
| TENA SLIP SUPER MEDIUM | 711200 | 4 | 224 |
| TENA SLIP SUPER LARGE | 711300 | 5 | 280 |
| TENA SLIP MAXI LARGE | 712300 | 4 | 208 |
| TENA UNDERPAD SUPER 95G 60X60 | 771210 | 4 | 400 |

CHANGES NO. OF BOXES

SEND TO SCA ORDER SYSTEM        DELIVERY PLAN

---

DELIVERY PLAN

DELIVERY DATES:          CHANGE DATE: — 120

2001-06-01
2001-07-01
2001-08-01
2001-09-01
2001-10-01

CANCEL — 122        SAVE — 124

DONE                    LOCAL INTRANET

FIG. 11

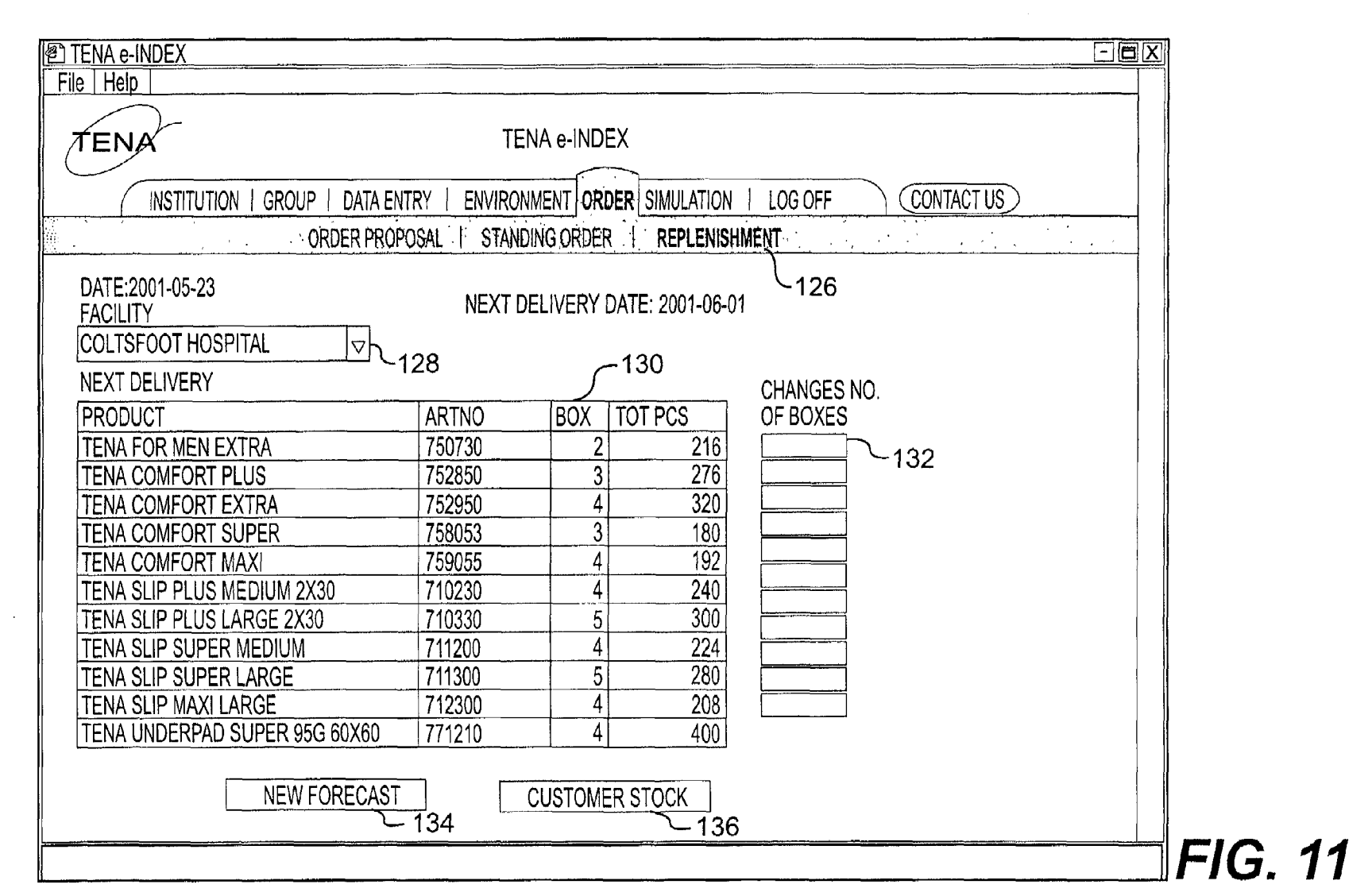

TENA e-INDEX

INSTITUTION | GROUP | DATA ENTRY | ENVIRONMENT | ORDER | SIMULATION | LOG OFF

ORDER PROPOSAL | STANDING ORDER | REPLENISHMENT — 126

DATE:2001-05-23
FACILITY
COLTSFOOT HOSPITAL ▽ — 128

NEXT DELIVERY                NEXT DELIVERY DATE: 2001-06-01 — 130

| PRODUCT | ARTNO | BOX | TOT PCS |
|---|---|---|---|
| TENA FOR MEN EXTRA | 750730 | 2 | 216 |
| TENA COMFORT PLUS | 752850 | 3 | 276 |
| TENA COMFORT EXTRA | 752950 | 4 | 320 |
| TENA COMFORT SUPER | 758053 | 3 | 180 |
| TENA COMFORT MAXI | 759055 | 4 | 192 |
| TENA SLIP PLUS MEDIUM 2X30 | 710230 | 4 | 240 |
| TENA SLIP PLUS LARGE 2X30 | 710330 | 5 | 300 |
| TENA SLIP SUPER MEDIUM | 711200 | 4 | 224 |
| TENA SLIP SUPER LARGE | 711300 | 5 | 280 |
| TENA SLIP MAXI LARGE | 712300 | 4 | 208 |
| TENA UNDERPAD SUPER 95G 60X60 | 771210 | 4 | 400 |

CHANGES NO. OF BOXES — 132

NEW FORECAST — 134      CUSTOMER STOCK — 136

CONTACT US

FIG. 22

TENA e-INDEX

INSTITUTION | GROUP | DATA ENTRY | ENVIRONMENT | ORDER | SIMULATION | LOG OFF

PRODUCTMIX PATIENT PROFILE NUMBER OF RESIDENTS INCONTINENCE DEGREE DATE INTERVAL PERSONNEL COST LAUNDRY COST GROUP LEVEL

COLTSFOOT HOSPITAL (10100) — 222
SIMULATION REPORT SUMMARY (16-12-1999 - 12-04-2000)
240

INCO RESIDENTS: 13 — 226
CURRENCY: GPB — 228
224

| INCO PRODUCTS 232 | NO OF PCS | COST | PRODMIX % |
|---|---|---|---|
| PADS | | | |
| TENA SLIP | 1764 | 535 | 35.2 |
| TENA COMFORT | 2882 | 572 | 57.6 |
| TENA LADY | 360 | 42 | 7.2 |
| TOTAL PADS | 5006 | 1149 | 100.0 |
| OTHER | | | |
| VARIOUS | 50 | 21 | |
| TOTAL OTHER | 50 | 21 | |
| TOTAL INCO | | 1170 | |

PERSONNEL COST IN REL. TO INCO CARE   12965

| ANNUALIZED COSTS | 234 |
|---|---|
| ESTIMATED COST | 3334 |
| ESTIMATED PERSONNEL COST | 38383 |

FIG. 23

TENA e-INDEX

| INSTITUTION | GROUP | DATA ENTRY | ENVIRONMENT | ORDER | SIMULATION | LOG OFF |

PRODUCTMIX PATIENT PROFILE NUMBER OF RESIDENTS INCONTINENCE DEGREE DATE INTERVAL PERSONNEL COST LAUNDRY COST GROUP LEVEL

COLTSFOOT HOSPITAL (10100) — 222  INCO RESIDENTS: 13 — 226
SIMULATION REPORT DETAIL (16-12-1999 - 12-04-2000) — 240  CURRENCY: GBP — 228

— 236

| INCO PRODUCTS — 242 | NO OF PCS | COST |
|---|---|---|
| PADS | | |
| TENA SLIP | | |
| TENA SLIP PLUS MEDIUM | 540 | 148 |
| TENA SLIP PLUS LARGE | 216 | 71 |
| TENA SLIP SUPER MEDIUM | 588 | 170 |
| TENA SLIP SUPER LARGE | 420 | 146 |
| TOTAL TENA SLIP | 1764 | 535 |
| TENA COMFORT | | |
| TENA COMFORT PLUS | 1012 | 141 |
| TENA COMFORT EXTRA | 280 | 53 |
| TENA COMFORT SUPER | 1590 | 378 |
| TOTAL TENA COMFORT | 2882 | 572 |
| TENA LADY | | |
| TENA COMFORT MINI | 360 | 42 |
| TOTAL TENA LADY | 360 | 42 |
| TOTAL PADS | 5006 | 1149 |

238

| KEY FIGURES | CHANGE RATE | COST/RES/DAY |
|---|---|---|
| PADS | 3.1 | .7 |
| TOTAL INCO | | .7 |

FIG. 24

TENA e-INDEX

| INSTITUTION | GROUP | DATA ENTRY | ENVIRONMENT | ORDER | SIMULATION | LOG OFF |

PRODUCTMIX PATIENT PROFILE NUMBER OF RESIDENTS INCONTINENCE DEGREE DATE INTERVAL PERSONNEL COST LAUNDRY COST GROUP LEVEL

COLTSFOOT HOSPITAL (10100) — 222
SIMULATION REPORT DETAIL (16-12-1999 - 12-04-2000) — 236

INCO RESIDENTS: 13 — 226
CURRENCY: GPB — 228

TOTAL INCO            1170

PERSONNEL COST IN REL. TO INCO CARE

|  | COST | NO OF PCS | COST/CHANGE | MIN/CHANGE |
|---|---|---|---|---|
| TENA SLIP | 5292 | 1764 | 3.0 | 10 |
| TENA COMFORT | 6917 | 2882 | 2.4 | 8 |
| TENA LADY | 756 | 360 | 2.1 | 7 |

TOTAL PERSONNEL COST IN REL. TO INCO CARE 12965 5006

PERSONNEL COST PER HOUR    18

— 240

TENA e-INDEX

File | Help

*TENA*

| INSTITUTION | GROUP | DATA ENTRY | ENVIRONMENT | ORDER | SIMULATION | LOG OFF |

PRODUCTMIX PATIENT PROFILE NUMBER OF RESIDENTS INCONTINENCE DEGREE DATE INTERVAL PERSONNEL COST LAUNDRY COST GROUP LEVEL

COLTSFOOT HOSPITAL (10100) — 222
SIMULATION REPORT - ORDER PROPOSAL — 244    INCO RESIDENTS: 13 — 226
ORDER PERIOD [1 MONTH ▽] — 246

ORDER PROPOSAL

| PRODUCT | ARTRIO | BOX | TOT PCS |
|---|---|---|---|
| TENA FOR MEN EXTRA | 750730 | 2 | 216 |
| TENA COMFORT PLUS | 752850 | 3 | 276 |
| TENA COMFORT EXTRA | 752950 | 4 | 320 |
| TENA COMFORT SUPER | 758053 | 3 | 180 |
| TENA COMFORT MAXI | 759055 | 4 | 192 |
| TENA SLIP PLUS MEDIUM 2X30 | 710230 | 4 | 240 |
| TENA SLIP PLUS LARGE 2X30 | 710330 | 5 | 300 |
| TENA SLIP SUPER MEDIUM | 711200 | 4 | 224 |
| TENA SLIP SUPER LARGE | 711300 | 5 | 280 |
| TENA SLIP MAXI LARGE | 712300 | 4 | 208 |
| TENA UNDERPAD SUPER 95G 60X60 | 771210 | 4 | 400 |

DATA ENTRY GRAPHICAL USER INTERFACE

BACKGROUND OF THE INVENTION

1. Field of the Invention

This invention relates to Graphical User Interfaces, and more particularly, Graphical User Interfaces offering data entry capabilities.

2. Related Art

Conventionally, data entry/dissemination relating to product acquisition is performed via a face-to-face meeting between a consumer and a manufacturer. In particular, a consumer meets with a manufacturer to discuss and communicate a desired product acquisition from the manufacturer. The manufacturer representative then returns to the manufacturer's offices in order to complete the request for product acquisition. Alternatively, the customer achieves product acquisition via a telephonic conference with the manufacturer. As a second alternative, the customer may use conventional postal services to achieve product acquisition. In particular, the customer sends the manufacturer a pre-filled order form describing the desired products for delivery.

There are several distinct disadvantages that are associated with the conventional methods for product acquisition. First, once the customer provides a product acquisition order to the manufacturer, it is difficult to modify the order without significant expenditure of effort by the customer and manufacturer. That is, the customer must once again open a communication stream with the manufacturer in order to modify the order. Subsequently, the manufacturer must make the necessary modifications to the existing order to ensure the customer receives the proper product(s). This process expends a significant amount of time and money on both the consumer and manufacturer sides.

Second, conventional methods of product acquisition do not provide a simple and straightforward means by which a manufacturer can effectively communicate product improvements and/or updates to the customer. In particular, in order to effectively communicate product update and/or improvement information to the customer, the manufacturer must modify order documents used by the customer. This is a time consuming process that delays effective release of newly developed products, and adds additional costs to the deployment of new and/or improved products.

In addition to the above, conventional methods for product acquisition do not facilitate allowing a customer to compare and contrast differences between orders. For example, the conventional methods for product acquisition do not allow a consumer the ability to compare the advantages and/or disadvantages between multiple order scenarios. This decreases the efficiency of the ordering process and possibly results in the procurement of unneeded products and/or redundant products.

Accordingly, it would be advantageous to create a graphical user interface (GUI) that is readily accessible to both the consumer and manufacturer, in order to facilitate ease of product acquisition on the consumer side. Moreover, it would be advantageous to create a GUI that would provide simplistic entry of data related to a product acquisition in a format that is easy to use and understand. Moreover, it would be desirable to provide a GUI with simulation attributes that allow a consumer the ability to compare various order proposals before finalizing a product acquisition order. Finally, it would be desirable to provide access to the GUI over a widely accessible medium, e.g., the World Wide Web.

SUMMARY OF THE INVENTION

In accordance with the above-identified disadvantages of the conventional art, it is an object of the present invention to provide a manufacturer generated GUI that allows a consumer the ability to enter product acquisition information.

It is further an object of the present invention to provide a manufacturer generated GUI presented in a simple to use and operate format.

Still further, it is an object of the present invention to provide a GUI that displays comparison information between a desired product acquisition order and a prior product acquisition order.

It is yet another object of the present invention to provide a GUI that displays budgetary information based upon present and past product acquisition orders.

It is further an object of the present invention to provide a manufacturer generated GUI that displays personal cost factors related to salaried employees.

It is yet another object of the present invention to provide a GUI capable of calculating and displaying order proposal information based upon prior consumption of ordered products.

It is yet another object of the present invention to provide a GUI capable of calculating and displaying simulation information related to order proposals.

In order to achieve the objects of the present invention, and other objects, there is provided a data entry graphical user interface system for supporting data entry relating to incontinence products. The data entry graphical user interface includes a plurality of layered graphical user interfaces, at least one of the plurality of layered graphical user interfaces includes a list of a plurality of individual incontinence products, and the at least one of the plurality of layered graphical user interfaces is functionally capable of receiving user input relating to each of the plurality of individual incontinence products.

Furthermore, provided is a data entry graphical user interface system, including a database storage system, and a plurality of graphical user interface screens associated with incontinence products and in direct or indirect communication with the database storage system. At least one of the graphical user interface screens includes modifiable data entry fields for modifying incontinence product data stored in the database storage system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 illustrates a data entry consumption GUI;

FIG. 5 illustrates a data entry consumption GUI including data confirmation, residents and consumption information;

FIG. 8 illustrates an order proposal GUI;

FIG. 9 illustrates a standing order GUI;

FIG. 10 illustrates an overlay window actuated from the standing order GUI illustrated in FIG. 9;

FIG. 11 illustrates a replenishment GUI;

FIG. 22 illustrates a simulation summary report GUI;

FIG. 23 illustrates a partial view of a simulation detail report GUI;

FIG. 24 illustrates a second partial view of the simulation detail report GUI illustrated in FIG. 23;

FIG. 25 illustrates a simulation order proposal report GUI;

DETAILED DESCRIPTION OF THE PREFERRED EMBODIMENTS

This application incorporates by reference, in its entirety, currently pending application having Attorney Docket Number 3613-0102P, filed on Jul. 25, 2001.

Figure 1:
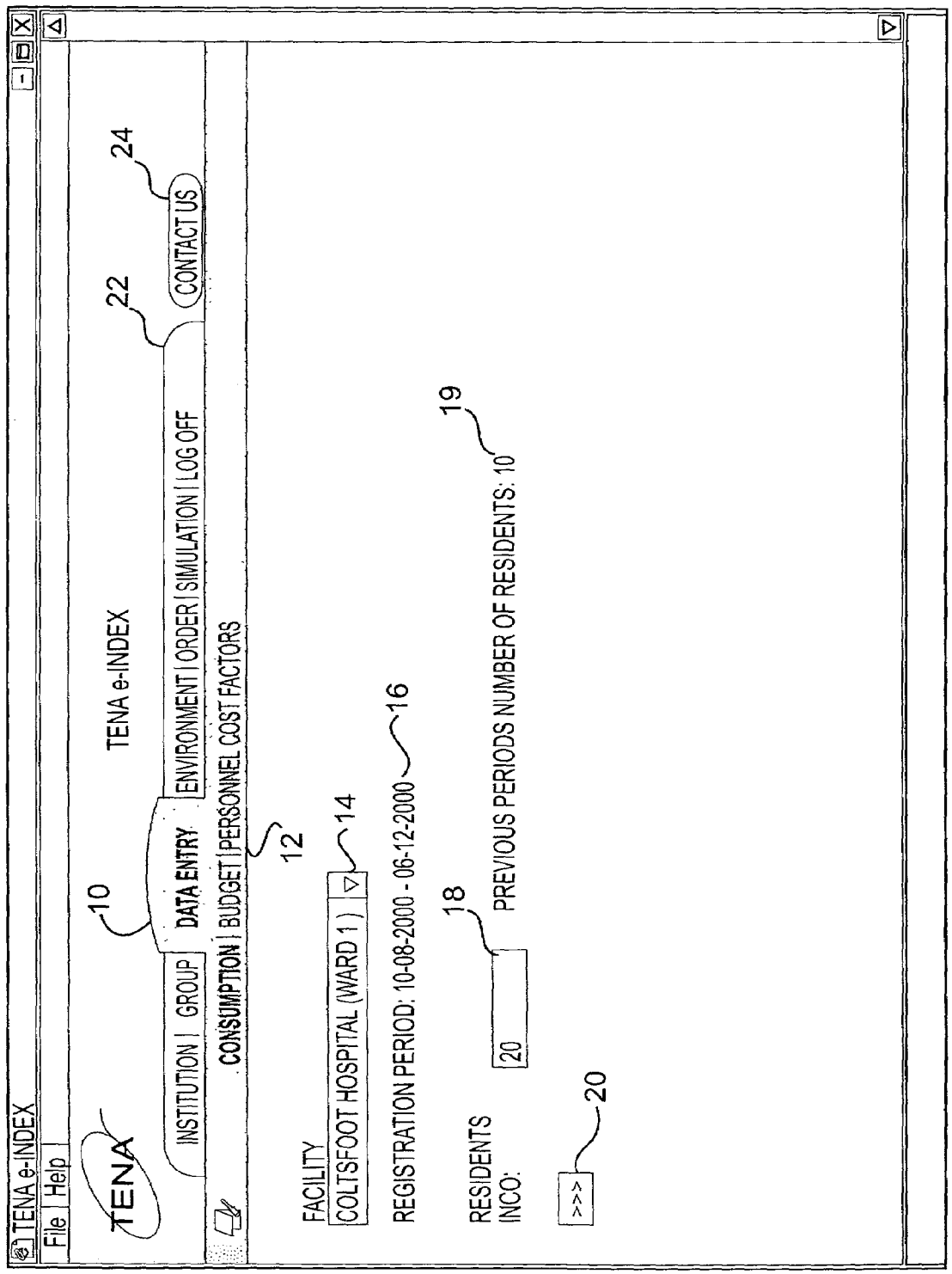
FIG. 1 illustrates a data entry GUI.

FIG. 1 illustrates a data entry consumption GUI, which is designed to be incorporated in the GUI environment disclosed in the above-referenced co-pending application. The GUI illustrated in FIG. 1 is accessible using a data entry GUI tab 10 (data entry GUI). Once the data entry tab 10 is selected, a link to a consumption GUI 12 is displayed. The consumption link 12 includes a facility drop down menu 14, a defined registration period 16, a residents incontinence field 18, and a contact us button 24. The facility drop down menu 14 includes various institutions, in this case hospitals, accessible via the consumption GUI 12. The data in the facility drop down menu 14 is stored in a conventional database (not shown), which is controlled preferably by the manufacturer, or a representative of the manufacturer. The registration period 16, shown predefined, defines the specific period for which the information entered and/or displayed will pertain to. The registration period 16 may be modified as desired, but typically in one month periods (not shown). The residents incontinence field 18 allows a user of the consumption GUI 12 to enter information pertaining to incontinence residents.

The consumption GUI 12 also includes a contact us button 24 and an arrow button 20. Regarding the contact us button 24, once this button is actuated an overlay window is displayed containing specific information relating to a manufacturer deploying the consumption GUI 12. Actuation of the arrow button 20 displays a subsequent screen of the data entry GUI 10, and if necessary first alerts a user, with a warning message 19, of a significant change in the number of residents using incontinence products. That is, when an alert is to be displayed, the arrow button 20 must be depressed twice to display a subsequent screen of the data entry GUI 10. In the case of the present invention, the number of users entered in the residents incontinence field 18 is compared with a stored number of residents, and if the comparison shows a +/−20% deviation, the warning message 19 is displayed indicating a previous number of residents using incontinence products. It should be noted that +/−20% predetermined value is used by way of example only, and other percentages may also be used based upon desired operational functionality of the data entry GUI 10.

Figure 3:
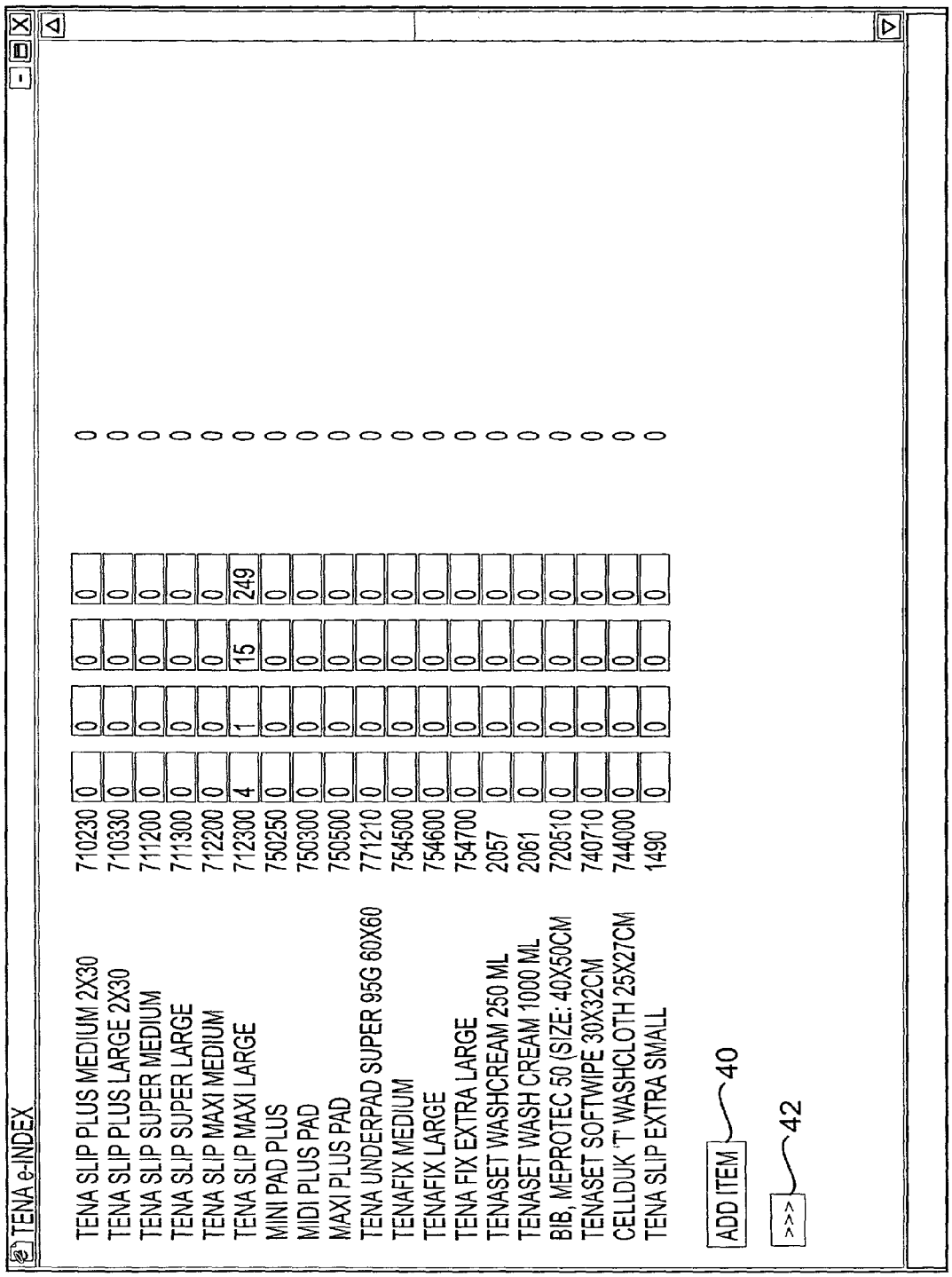
FIG. 3 illustrates a continuation of the data entry consumption GUI illustrated in FIG. 2.

FIGS. 2 and 3 illustrate a data entry consumption GUI with specific products used within the facility chosen in the drop down menu 14 illustrated in FIG. 1. In this case, actuation of the arrow button 20 (FIG. 1) displays a plurality of incontinence products 26 (FIG. 2). However, the present invention is not limited to displaying of incontinence products 26. Instead, other products may also be displayed based on the type of database the present GUI environment is interfaced with.

As is seen in FIGS. 2 and 3, this screen of the data entry GUI 10 includes a plurality of modifiable fields 28. In particular, each product 31 listed in the incontinence data 26 includes a field pertaining to box 30, bag 32, pieces 34 and total pieces 36. Each box and bag contains a specific number of a given incontinence product type, whereas pieces refers to incontinence products counted individually. Therefore, the various total pieces 36 fields reflect a total number of incontinence product units in each box and bag field summed with the individual units entered in a respective pieces 34 field. Data entered in the fields (30, 32, 34 and 36) is used to generate reports indicative of product use. Such reports are described in detail in the above-referenced co-pending patent application, and include, summary and detailed reports relating to incontinence care product use. Additionally, each product listed in the incontinence data 26 includes an un-modifiable previous period field 38. The data entry GUI 10 illustrated in FIG. 2 also includes an add item button 40 and an arrow button 42 (see FIG. 3).

Depressing the arrow button 42 activates a comparison between the total pieces field 36 and the previous period field 38. If the comparison of the two fields results in a +/−20% deviation, a warning message 39 is displayed indicating there was a significant increase/decrease in the total number of incontinence product used since the last period. Otherwise, depressing the arrow button 42 displays a subsequent screen of the data entry GUI 10 of the present invention. It should be noted that +/−20% is used by way of example only, and other percentages may also be used based upon desired operational functionality of the data entry GUI 10.

Figure 4:
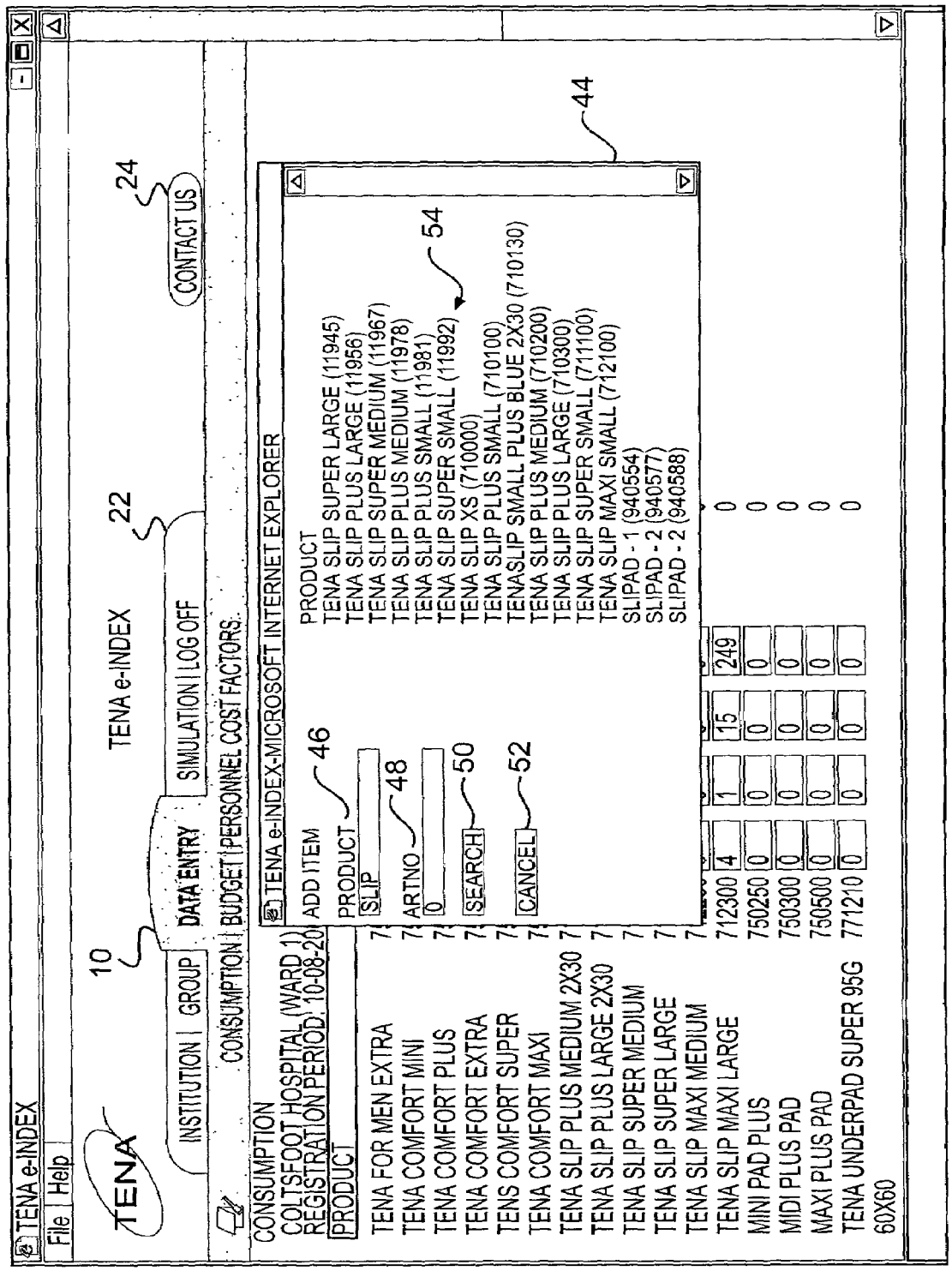
FIG. 4 illustrates an overlay window actuatable from the data entry consumption GUI illustrated in FIG. 2.

Depressing the add item button 40 displays an overlay window 44, as is illustrated in FIG. 4. The overlay window 44 includes a product input field 46, an article number input field 48, a search button 50 and a cancel button 52. The overlay window 44 also includes a product listing section 54. The overlay window 44 allows the user to enter a specific product type and/or article number in order to search for and add such an article to the product list 31 illustrated in FIG. 2. Adding a product to the data entry GUI 10 screen shown in FIG. 2 allows a user the opportunity to subsequently track the added product.

The data entered in FIGS. 2 and 3 is eventually stored in the manufacturer's database and is used to assist a user(s) in requesting a proper quantity of product(s) when an order is placed.

FIG. 5 illustrates a data entry consumption GUI including data confirmation, residents and consumption information. Specifically, the data entry GUI 10 screen includes a confirmation of the number of residents entered in residents incontinence field 18 of FIG. 1, and the total consumption information entered in the product fields 30, 32, 34 and 28 of FIGS. 2 and 3. This information is displayed in unmodifiable fields 54 and 56.

Also shown in FIG. 5 is a keyfigures section 57. The keyfigures section 57 displays information pertaining to total costs aggregated for both reported (current) and previous periods. In particular, the keyfigures section 57 includes the cost, change rate and cost-per-resident for each period. The periods listed are a reported period, or a current period, and a previous period. The reported period relates to the current consumption of incontinence products during a given registration period, whereas the previous period relates to previously entered consumption data. The keyfigures section 57 provides the user with a concise summary of key data relating to incontinence product consumption over a specific period; moreover, the keyfigures section 57 offers a means by which a user can troubleshoot discrepancies in entered figures. In particular, should the entry of consumption data result in large discrepancies between the figures displayed in the two periods, a user would readily realize that an error in data entry likely occurred.

The data entry GUI 10 screen illustrated in FIG. 5 further includes a change registration button 58, a delete registration data button 60 and a confirm registration data button 62. The change registration data button 58 allows the user to modify the registration period 16 displayed in FIG. 1, and further allows the user to modified entered consumption data before confirmation, or database storage. The delete registration data button 60 allows a user to abort reporting the data shown in fields 54 and 56. Whereas the confirm registration data button 62 allows a user to update the database system with the data shown in fields 54 and 56.

Figure 6:
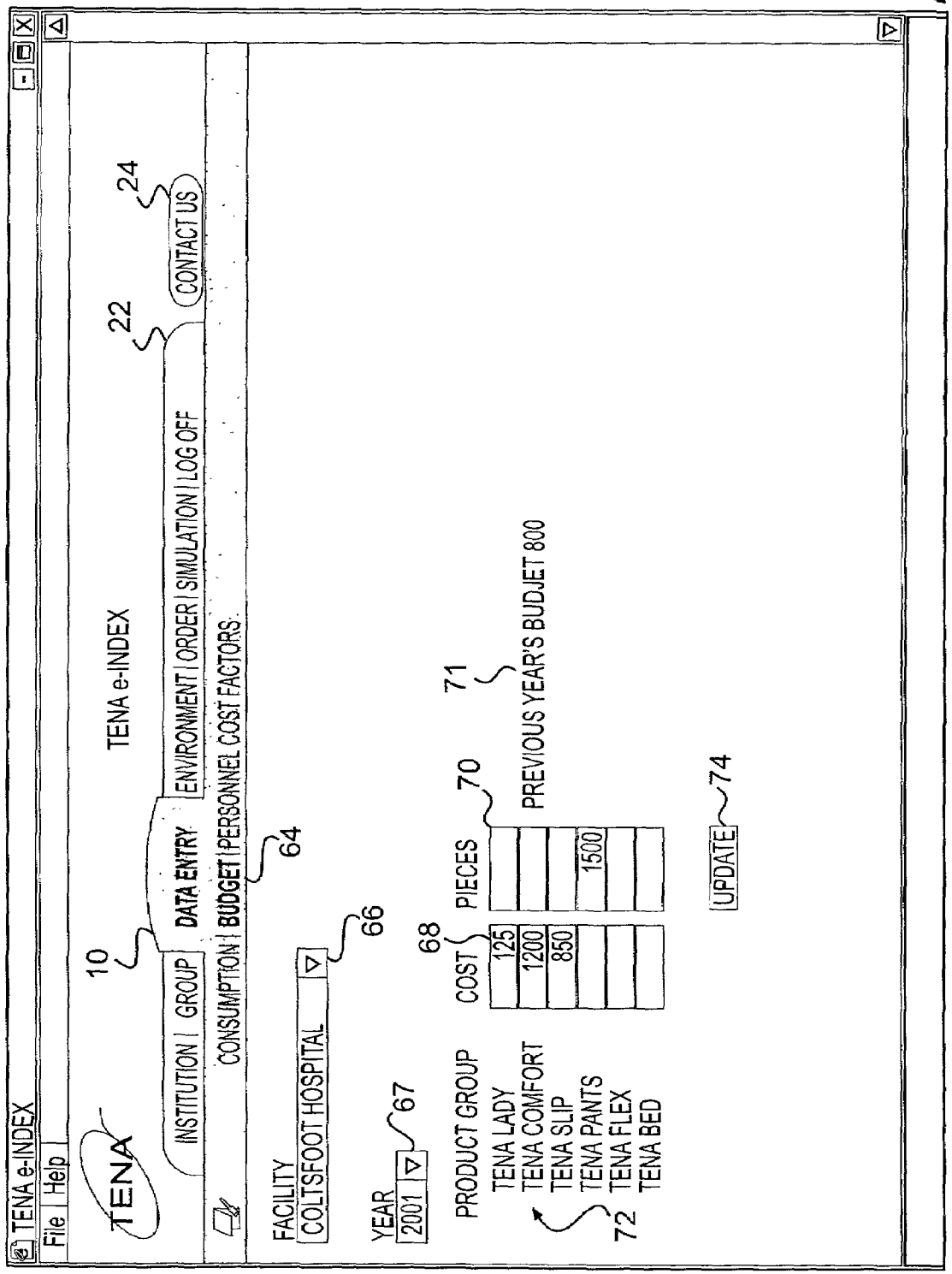
FIG. 6 illustrates a data entry budget GUI.

FIG. 6 illustrates a data entry budget GUI. The data entry budget GUI 64 is displayed via a link associated with the data entry GUI 10. The data entry budget GUI 64 includes a facility drop down menu 66. Similar to the facility drop down menu 14 illustrated in the data entry GUI 10 of FIG. 1, the facility drop down menu 66 allows a user to access various institutions and hospitals contained within the database. The data entry budget GUI 64 further includes a year drop down menu 67. The year drop down menu 67 allows a user to select from various years displayed on the drop down menu. Additionally, the GUI 64 includes a plurality of cost fields 68 and a pieces field 70. Each of these fields 68 and 70 relates to a specific product group 72. Data entered in the fields 68 and 70 may be stored in the database using an update button 74.

Moreover, actuation of the update button 74 first compares the entered costs and pieces (fields 68 and 70) against costs and pieces figures entered in previous years. Of course, the costs and pieces figures are stored in the database that the data entry GUI 10 of the present invention is interfaced with. If the comparison shows +/−20% deviation over/under that which was entered in the previous year(s), then the system displays a warning message 71. It should be noted that +/−20% is used by way of example only, and other percentages may also be used based upon desired operational functionality of the data entry GUI 10. If the warning message 71 is displayed, then a subsequent actuation of the update button 74 will carryout the database update procedure.

Figure 7:
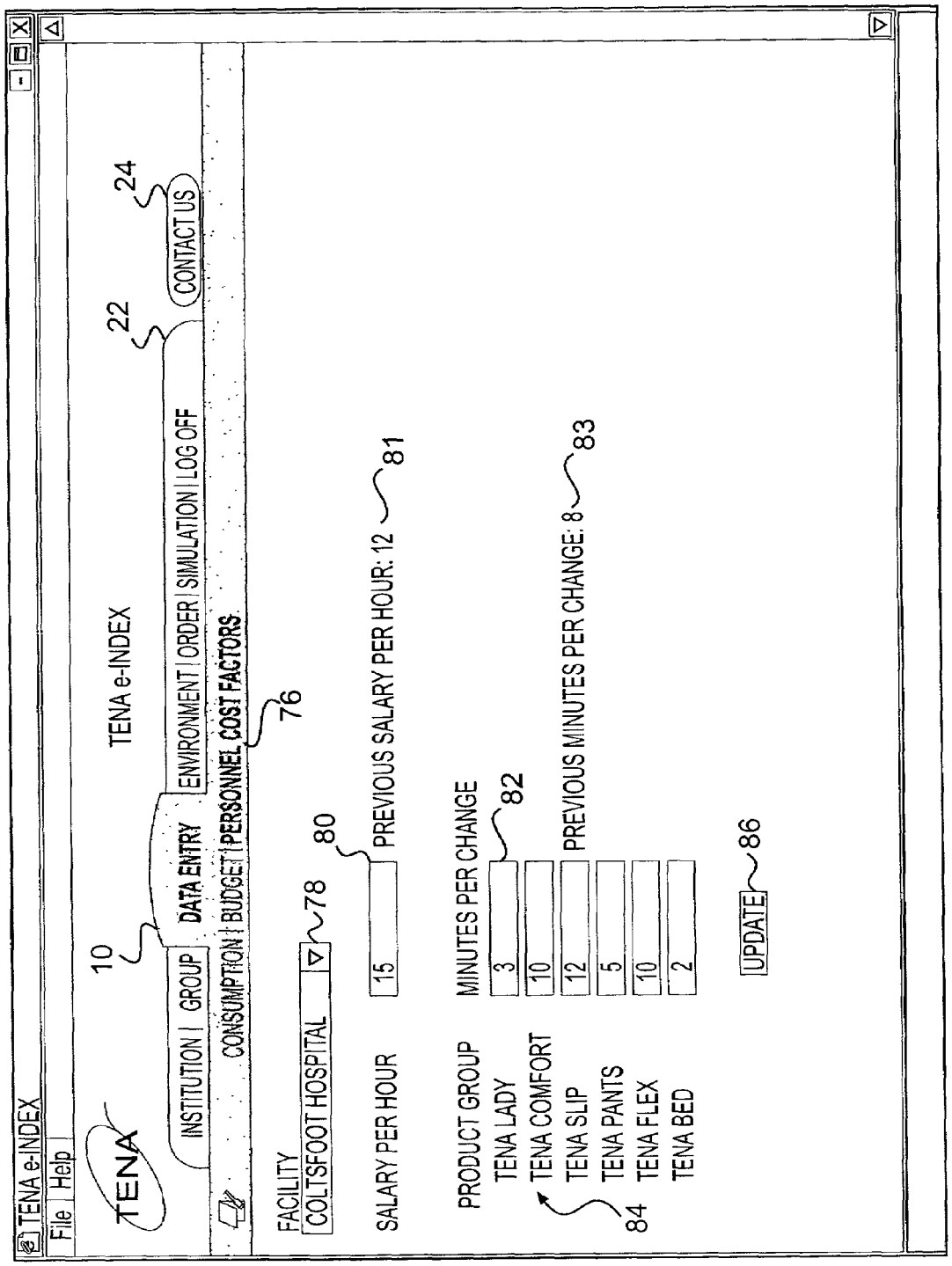
FIG. 7 illustrates a data entry personnel cost factors GUI.

FIG. 7 illustrates a data entry personnel cost factors GUI. Similar to previous GUI's described herein. The data entry personnel cost factors GUI 76 includes a facility drop down menu 78. The facility drop down menu 78 functions in the same manner as other drop down menus previously described herein. The GUI 76 further includes a salary per hour input field 80. The salary per hour input field 80 allows a user to enter salary information relating to a particular type of worker. Also included in the data entry personnel cost factors GUI 76 are a plurality of specific product input fields 82. These product input fields 82 allow a user to input the specific number of minutes allotted per change of a given incontinence care product for the salary amount input into the salary per hour input field 80. Once the desired information is entered in the fields 80 and 82, the user may update the database using the update button 86.

Similar to the other GUIs of the present invention, warning messages (81 and 83) may also be displayed if necessary. That is, a +/−20% comparison of the data entered in the fields 80 and 82 with existing stored database data is performed, and determined increase or decrease of 20% will result in a warning message being displayed. Therefore, if a warning message(s) must be displayed, then the update button 86 must be depressed a subsequent time to properly update the database.

The information entered and stored by way of using the various data entry GUIs of the present invention (Consumption, Budget and Personal Cost Factors) is used and displayed in the various reports generated by the GUI environment disclosed in the co-pending application referenced hereinabove.

FIG. 8 illustrates an order proposal GUI 90. The order proposal GUI 90 is accessible using an order GUI tab 88. The order proposal GUI 90 includes a facility drop down menu 92, a number of residents drop down menu 94, an order proposal drop down menu 96, and data fields 98. The facility drop down menu 92 functions in the same manner as previously described. The number of residents drop down menu 94 allows a user to select a specific number relating to the total number of residents in the facility displayed and selected in the facility drop down menu 92. The order proposal drop down menu 96 relates specifically to the amount of time the products ordered in the current order is designed to cover. The amount of time illustrated in FIG. 8 is one month; however, days, a plurality of months, or years may also be used if desired.

A user of the order proposal GUI 90 may enter the specific quantity of products for order in fields 98. Each specific field 98 relates to one of the products listed in fields 100. Once the desired quantity of product is entered in fields 98, a user may select the send SCA order system button 102 to complete the order and send the information to the manufacturer database for subsequent order fulfillment. As an alternative, the user may leave the fields 98 blank. In this case, once the send SCA order system button 102 is selected, the number of boxes listed in the order proposal 100 by the manufacturer would be used to fulfill the order. The manufacturer suggested product order is based upon a total incontinence product consumption over prior periods. In this case, the product listing is based upon consumption over two periods. The two timeframe period is used by way of example only.

FIG. 9 illustrates a standing order GUI 104. The standing order GUI 104 relates to user defined orders which occur on a reoccurring basis. As is seen in FIG. 9, the standing order GUI 104 includes a facility drop down menu 106, a change next order date field 108, a data entry field 110, a product listing 112 and user actuatable buttons 114 and 116. Once a specific field is chosen from the facility drop down menu 106, the user may change a future order date by entering a new date in the change next order date field 108. Furthermore, if a different number of products is desired on the given order date, the user may modify the number of products desired using fields 110. Once this information is entered, the user may either send the data to the manufacturer using the send button 114, or view a delivery plan using button 116 (discussed hereinafter).

FIG. 10 illustrates an overlay window accessible using the delivery plan button 116 illustrated in FIG. 9. The overlay window 118 allows the user to modify future delivery dates within the standing order system. The delivery dates may be modified using fields 120 shown in the overlay window 118. In order to cancel a delivery data modification, the user may select a cancel button 122, or to save and store the information in the manufacturer database, the user selects a save button 124.

FIG. 11 illustrates a replenishment GUI. The replenishment GUI 126 includes a facility drop down menu 128, which allows a user to select a desired facility. The facility drop down menu 128 shown in the replenishment GUI 126 operates in the same fashion as other drop down menus discussed herein. In addition to the menu 128, the GUI 126 also includes a next delivery listing 130 that includes the products designated for a future delivery date. Upon review this information, a user may decide to modify a future delivery of products or forecast product use. In particular, a user may increase or reduce the number of products for delivery using change number of boxes fields 132. Once a desired number of change number of boxes fields 132 have been properly filled, a user has the option of selecting either a new forecast button 134 or a customer stock button 136.

Figure 12:
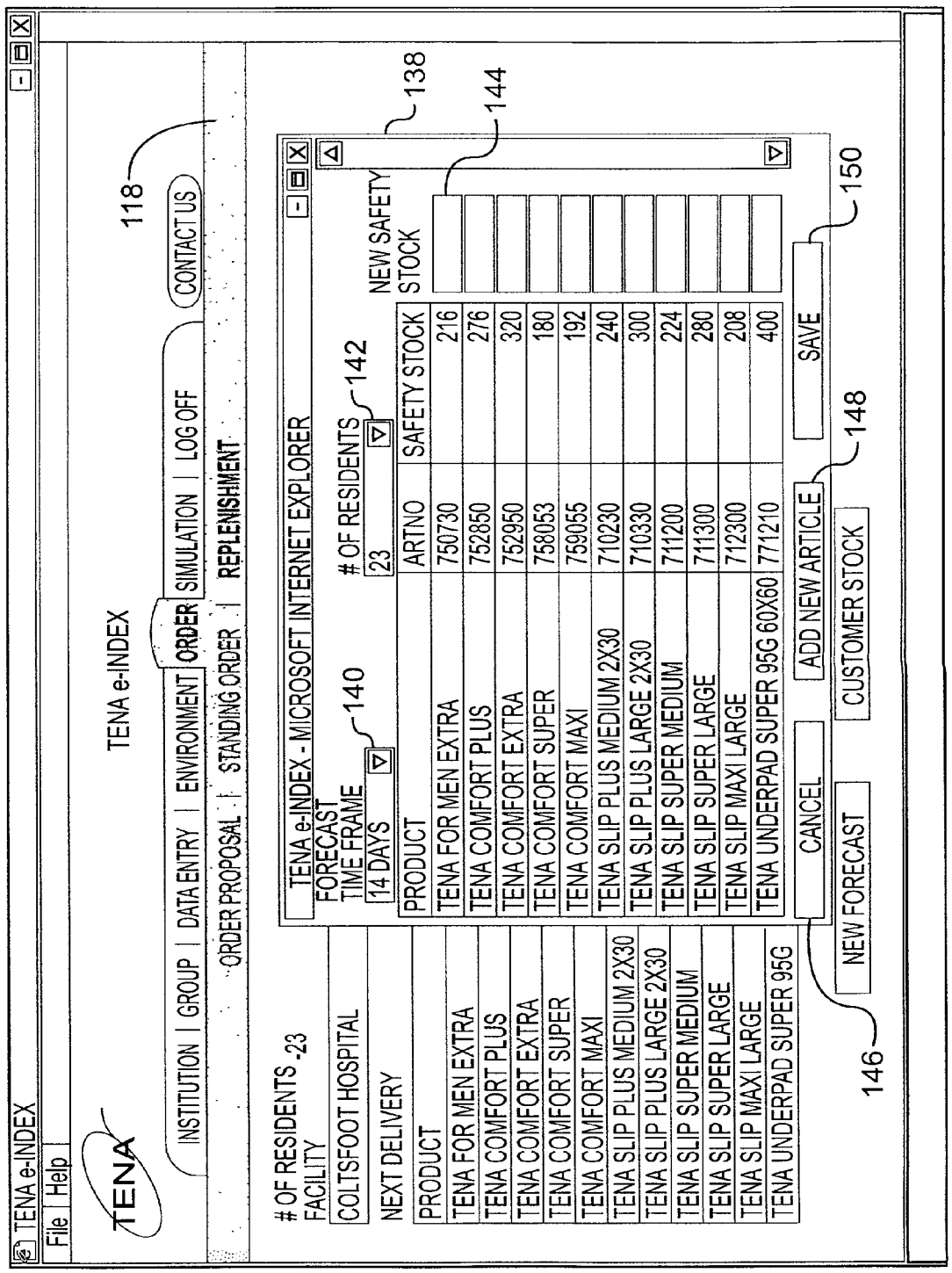
FIG. 12 illustrates a forecast overlay window actuatable from the replenishment GUI illustrated in FIG. 11.

FIG. 12 illustrates a forecast overlay window actuatable from the replenishment GUI illustrated in FIG. 11. The overlay window 138 includes a time frame dropdown menu 140, a number of residents dropdown menu 142, a plurality of new safety stock fields 144, and cancel 146, add new article 148 and save 150 buttons. The time frame 140 and number of residents 142 menus allow a user to modify the number of days and the number of residents to forecast, respectively. The new safety stock fields 144 allow a user to modify the current safety stock level if desired. Moreover, a user may add articles to the product listing suing the add new article button 148. The data modified with in the overlay window 138 may be saved in the database system using the save button 150 and will affect, pursuant to the modified data, the next delivery date and the quantity of product delivered. The cancel button 146 will abort cancel any changes made in the overlay window 138 and return the user to the replenishment GUI 126.

Figure 13:
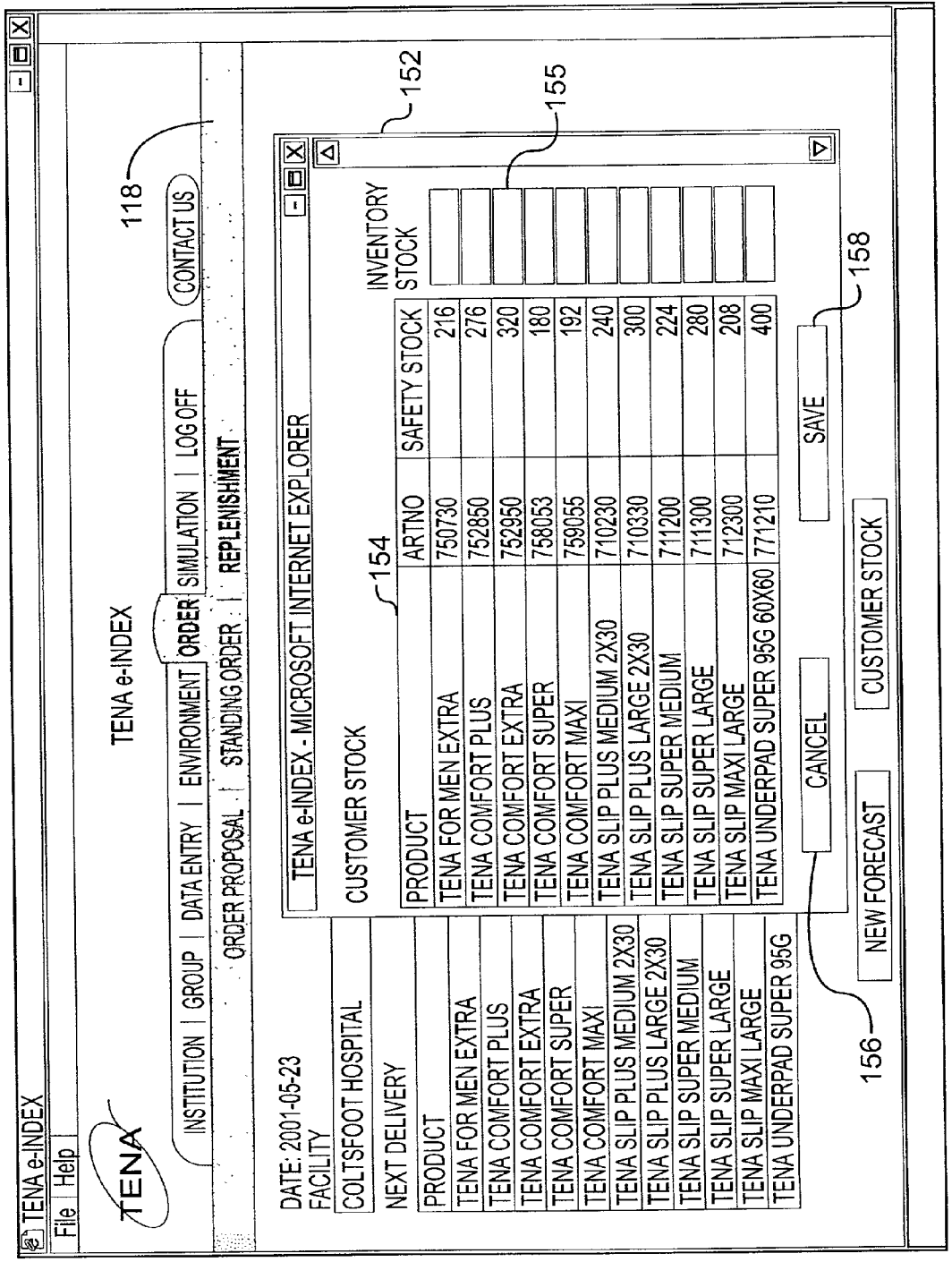
FIG. 13 illustrates a customer stock overlay window actuatable from the replenishment GUI illustrated in FIG. 11.

FIG. 13 illustrates a customer stock overlay window actuatable from the replenishment GUI illustrated in FIG. 11. The customer stock window 152 is displayed once the customer stock button 136 is selected (FIG. 10). The customer stock window 152 includes a customer stock listing 154, inventory stock update fields 155, a cancel button 156 and a save button 158. Selection of the cancel button will abort any changes made in the customer stock window 152 and return to the replenishment GUI 126. Alternatively, the save button 158 will update a customer's stock based upon information entered in the inventory stock fields 155. In particular, a user may either increase or decrease on-hand stock by entering a desired number of products in the inventory stock fields 155. This data is saved in the manufacture's database upon actuation of the save button 158.

Figure 14:
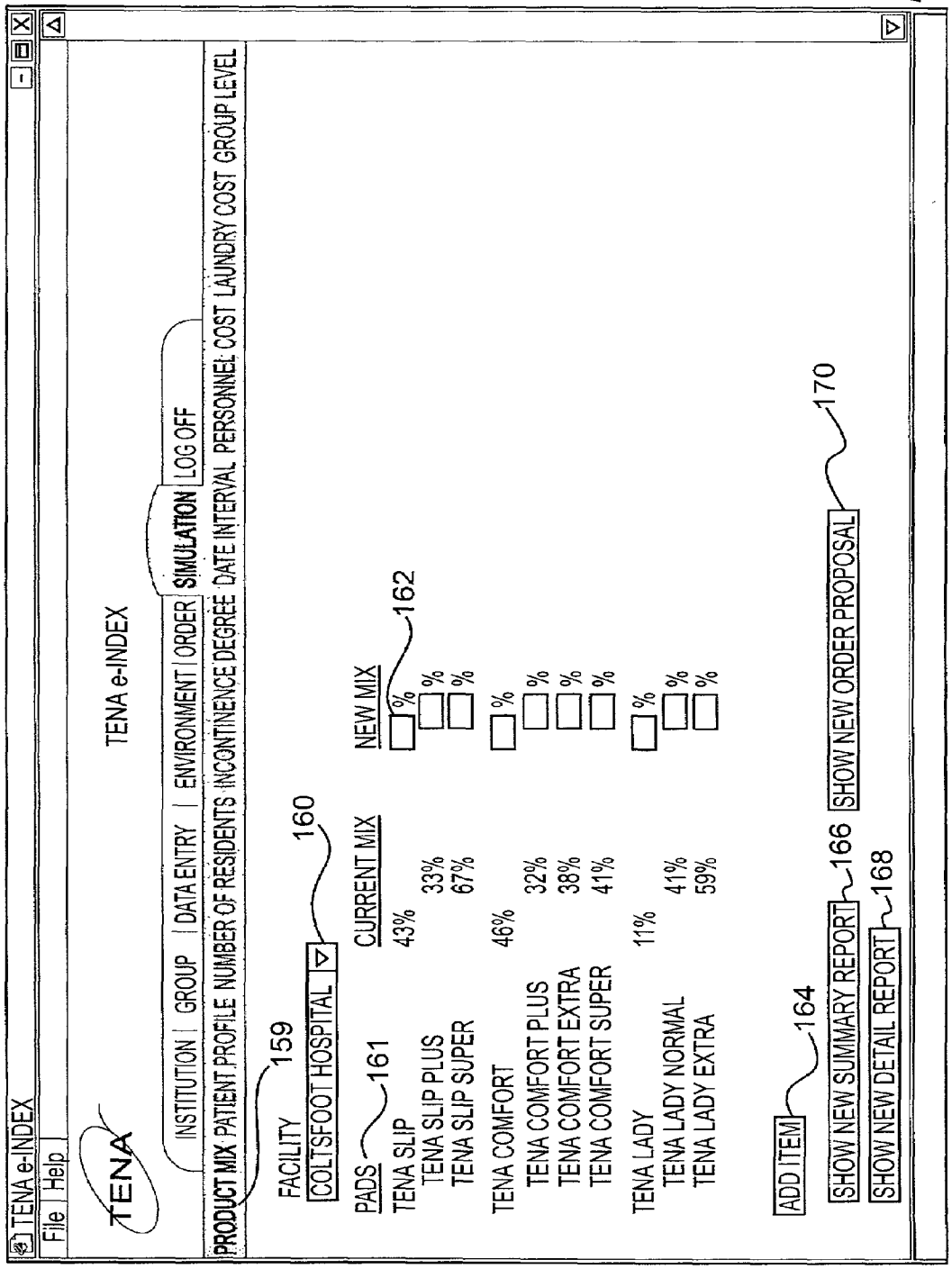
FIG. 14 illustrates a simulation product mix GUI.

FIG. 14 illustrates a simulation product mix GUI. The simulation product mix GUI 159 is accessible once a date interval is selected from a simulation data interval GUI (FIG. 18). This is true for each of the subsequently discussed simulation GUIs. Alternatively, this and each subsequent discussed and illustrated GUI may be accessed before a date interval is selected. As is seen in the figure, the product mix GUI 159 includes a dropdown menu 160 that includes selectable hospitals or institutions. Also illustrated in FIG. 14 is a product listing section 161 that includes new mix fields 162. There is a new mix field 162 associated with each product listed in the product listing section 161. The simulation product mix GUI 159 also includes add item 164, show new summary report 166, show new detail report 168 and show new order proposal 170 buttons. These buttons also are included in the GUIs illustrated in FIGS. 15-20. For brevity, the discussion of these buttons will not be repeated after the initial description thereof.

The product listing section 161 also includes a current mix subsection. The current mix subsection illustrates the current percentages of incontinence products on-hand at the hospital or institution selected in the dropdown menu 160. In FIG. 14, several primary products (e.g., TENA slip) and sub-products (e.g., TENA Slip Plus) are listed. However, the present invention is not limited to the products shown. In particular, any variety of primary/sub products may be listed depending on the specific incontinence products in stock at the selected hospital or institution. Products listed in the product listing 161 are retrieved from a database system connected to the data entry GUI 10 of the present invention.

Once any new percentages are entered in the new mix fields 162, a user may select one of the show new summary report 166, show new detail report 168 or show new order proposal 170 buttons. Depending on the button selected, a report is shown reflecting the percentages entered in the new mix fields 162. The details of these reports will be discussed hereinafter.

Alternatively, if other data needs to be modified before a report is displayed, the add item button 164 may be selected. Selecting the add item button 164, before a report button, registers the changes made on a given GUI and subsequently gives a user the option of accessing another simulation GUI for modification of data therein.

Figure 15:
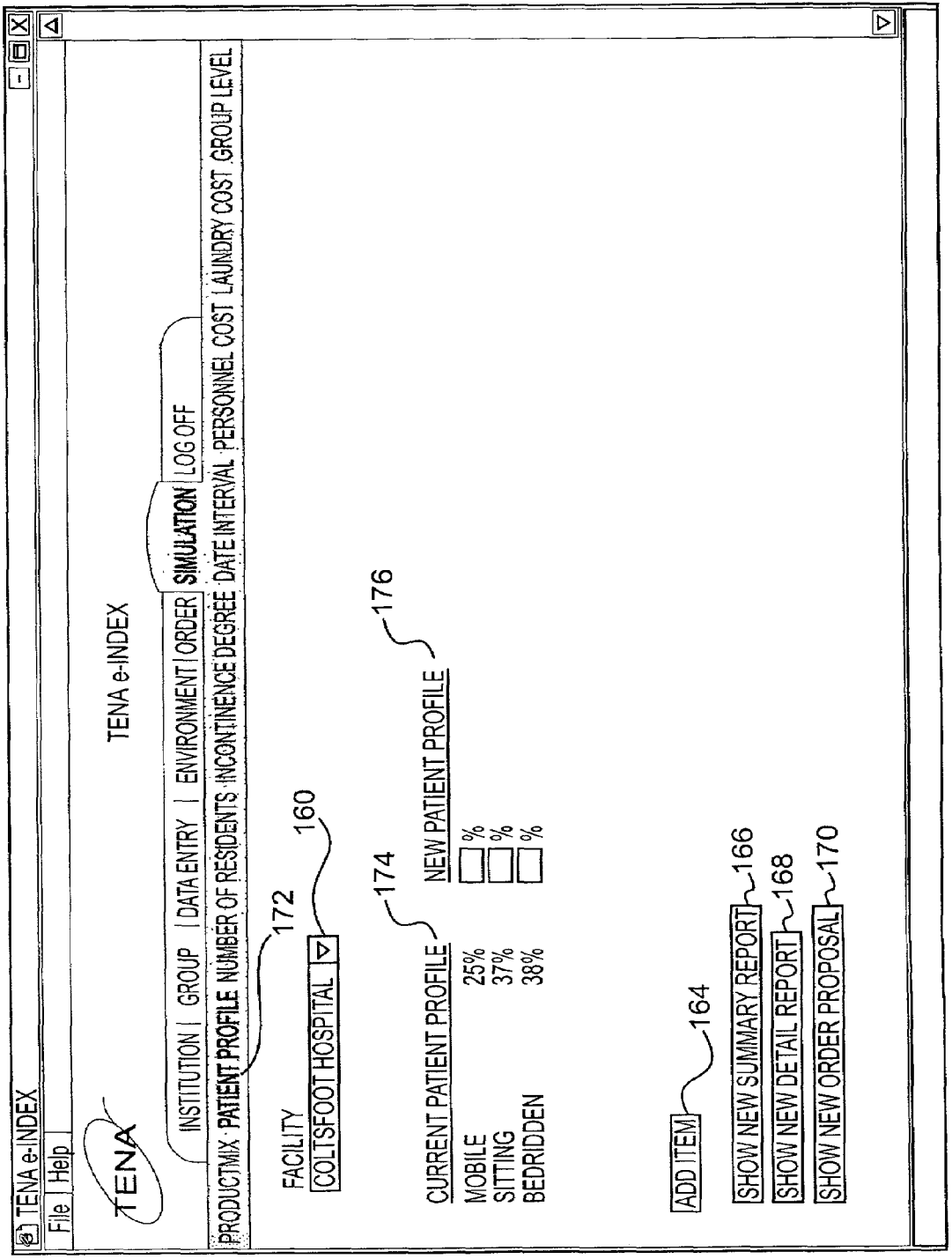
FIG. 15 illustrates a simulation patient profile GUI.

FIG. 15 illustrates a simulation patient profile GUI. The simulation patient profile GUI 172, and several subsequently discussed GUIs, includes several items, with like reference numerals, also found in the simulation product mix GUI 159. For brevity, the operational characteristics of these items will not be repeated. The simulation patient profile GUI 172 includes a current and new patient profile listing 174, which includes new patient profile fields 176.

Once any new percentages are entered in the new patient profile list 174, a user may select one of the add item 164, the show new summary report 166, show new detail report 168 or show new order proposal 170 buttons. Depending on the button selected, a report is shown reflecting the percentages entered in the new patient profile list 174, or the changes are stored.

Figure 16:
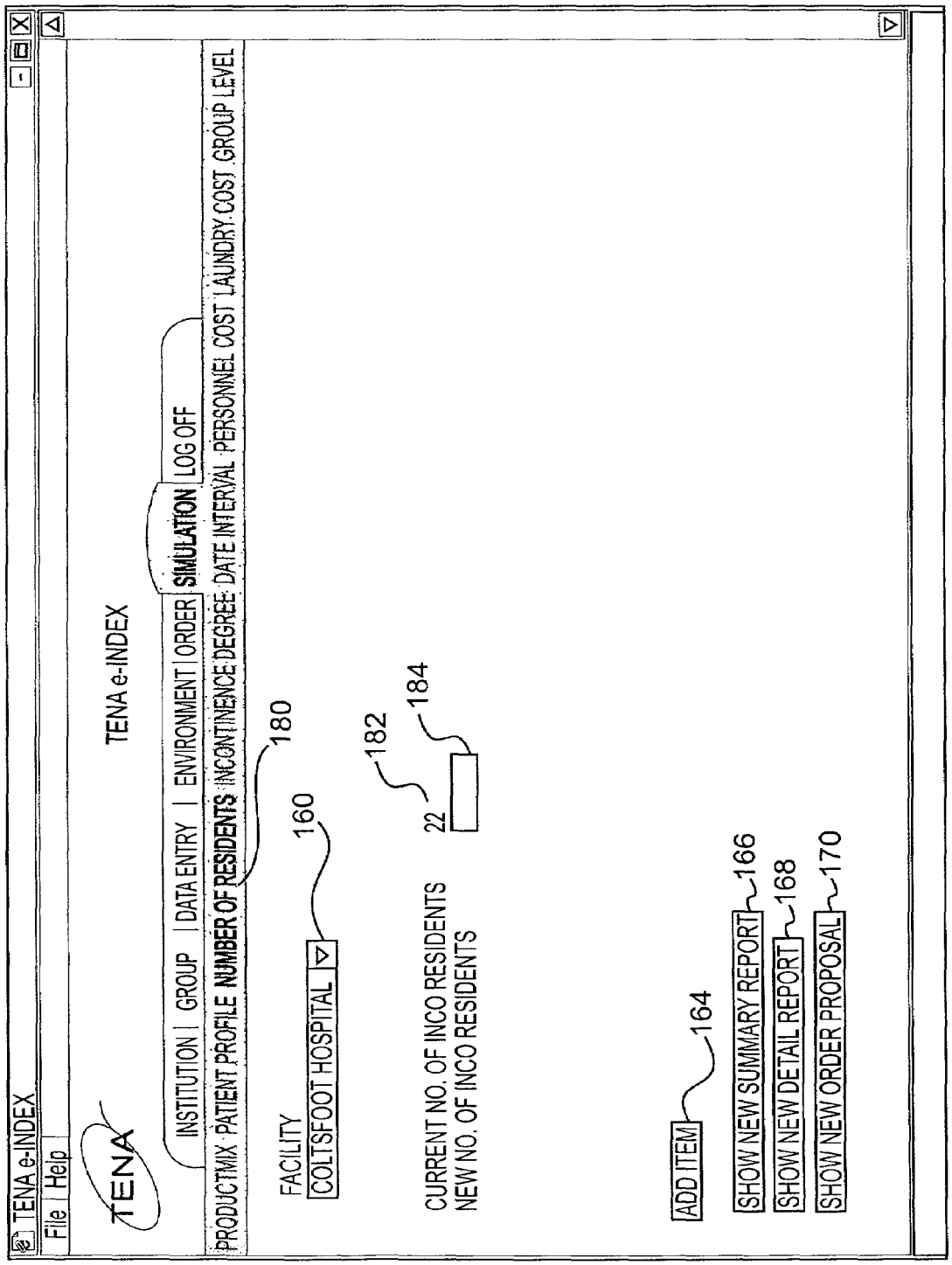
FIG. 16 illustrates a simulation number of residents GUI.

FIG. 16 illustrates a simulation number of residents GUI. The number of residents GUI 180 includes a display of the current number of incontinence residents 182 in the chosen hospital or institution, and a modifiable new number of incontinence residents field 184. Using the modifiable new number of incontinence residents field 184, a user may change the stored number of incontinence residents. Depending on the button selected, a report is shown reflecting the entered change in the number of residents, or the change is stored (using add button 164).

Figure 17:
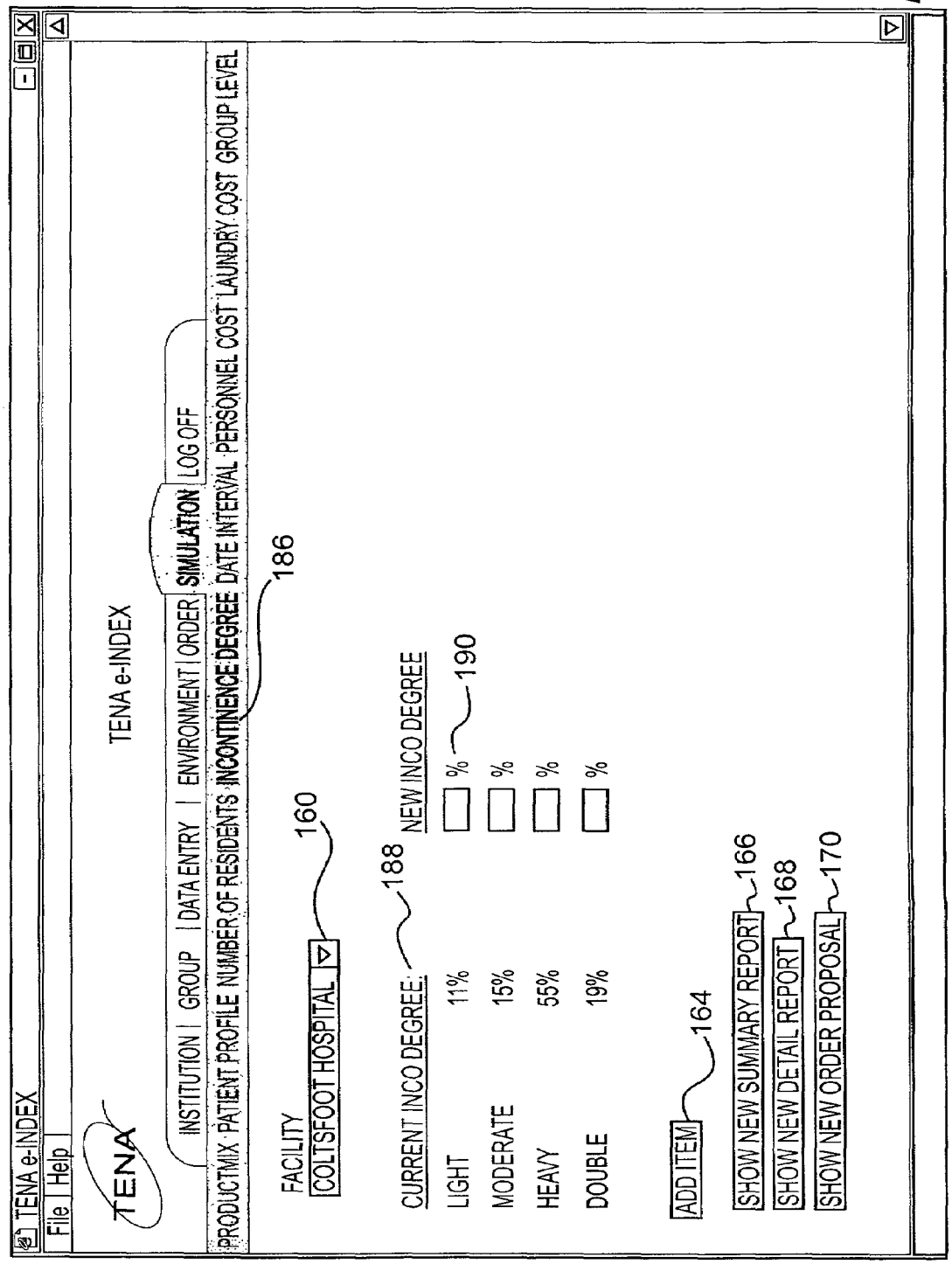
FIG. 17 illustrates a simulation incontinence degree GUI.
Figure 18:
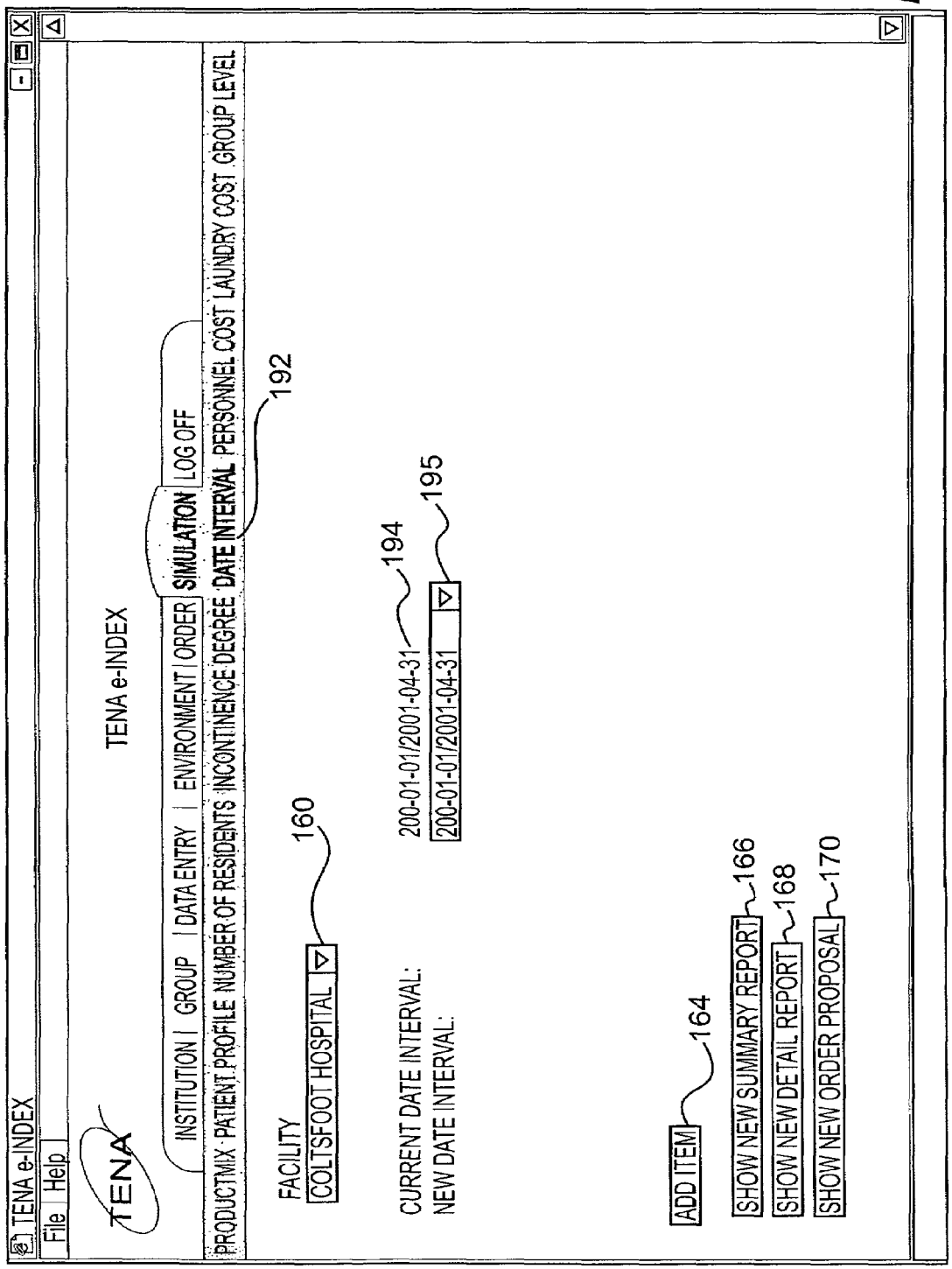
FIG. 18 illustrates a simulation date interval GUI.

FIG. 17 illustrates a simulation incontinence degree GUI. The simulation incontinence degree GUI 186 includes a current incontinence degree listing 188, which includes new incontinence degree fields 190. A user may modify the current incontinence degree listing 188 using the new incontinence degree fields 190.

FIG. 18 illustrates a simulation date interval listing. The simulation data interval listing 192 includes a display of the current date interval 194 and a modifiable data interval dropdown menu 195. A user may modify the current data interval using the modifiable data interval dropdown menu 195.

Figure 19:
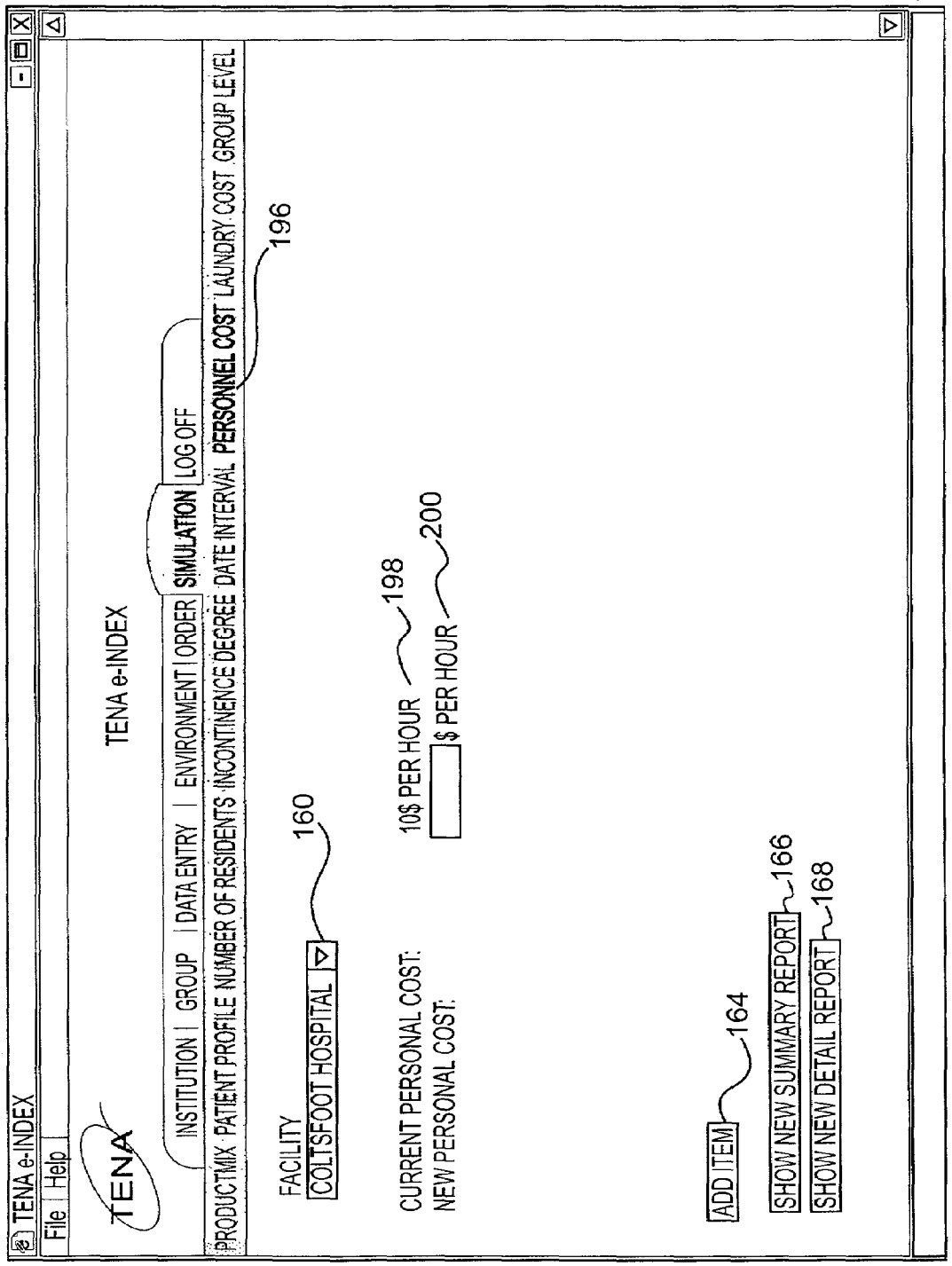
FIG. 19 illustrates a simulation personnel cost GUI.

FIG. 19 illustrates a personnel cost GUI. The personnel cost GUI 196 includes a current personnel cost section 198 and a new personnel cost modifiable field 200. A user may modify the current personnel cost using field 200. As illustrated in the figure, the costs are in U.S. dollars; however, other currencies may also be used as desired.

Figure 20:
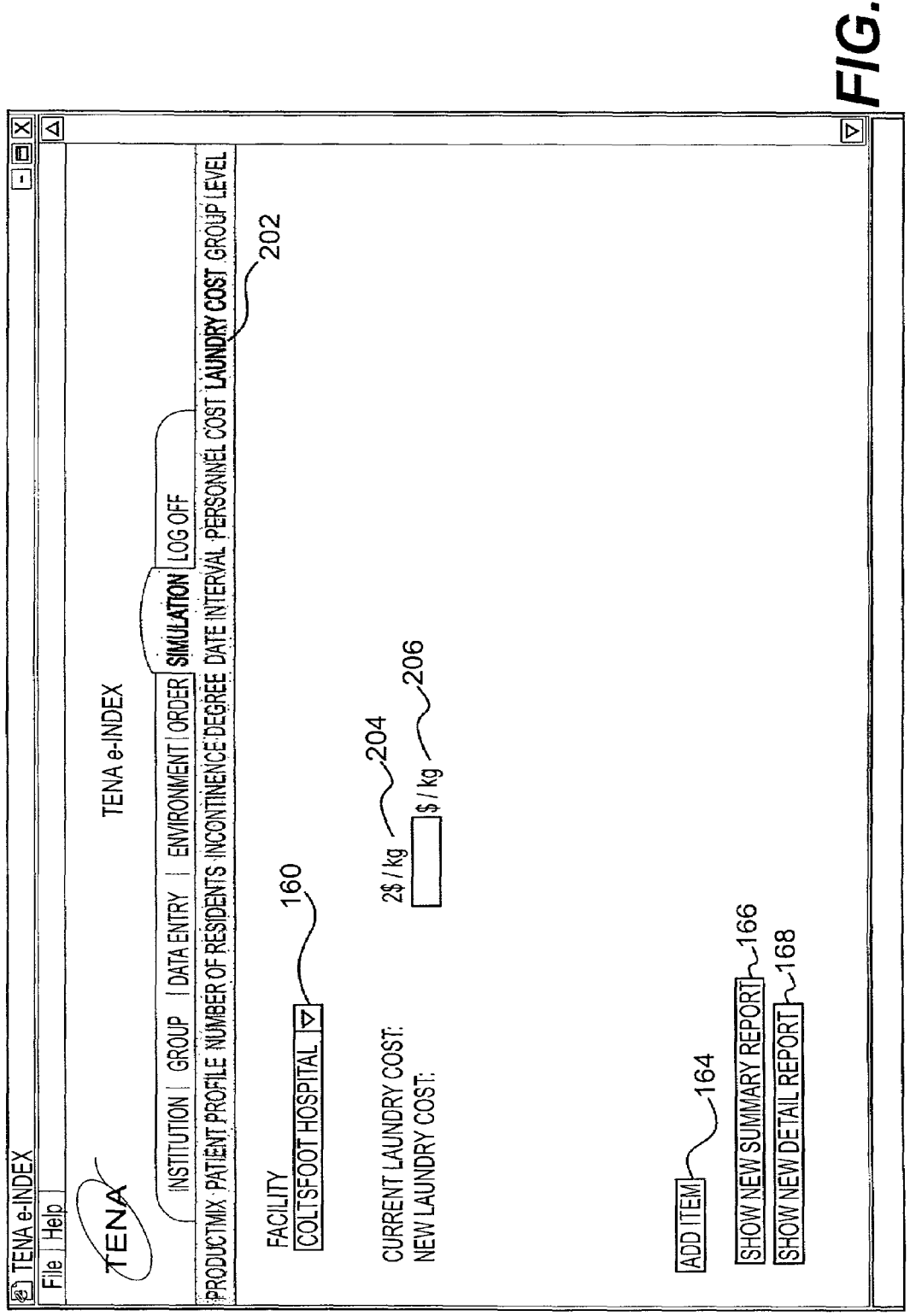
FIG. 20 illustrates a simulation laundry cost GUI.

FIG. 20 illustrates a laundry cost GUI. The laundry cost GUI 202 includes a current laundry cost section 204 and a new laundry cost modifiable field 206. A user may modify the current laundry cost using the field 206. As illustrated in the figure, the cost is in dollars per kilogram (kg). However, different cost/weight ratios may also be used as desired.

Figure 21:
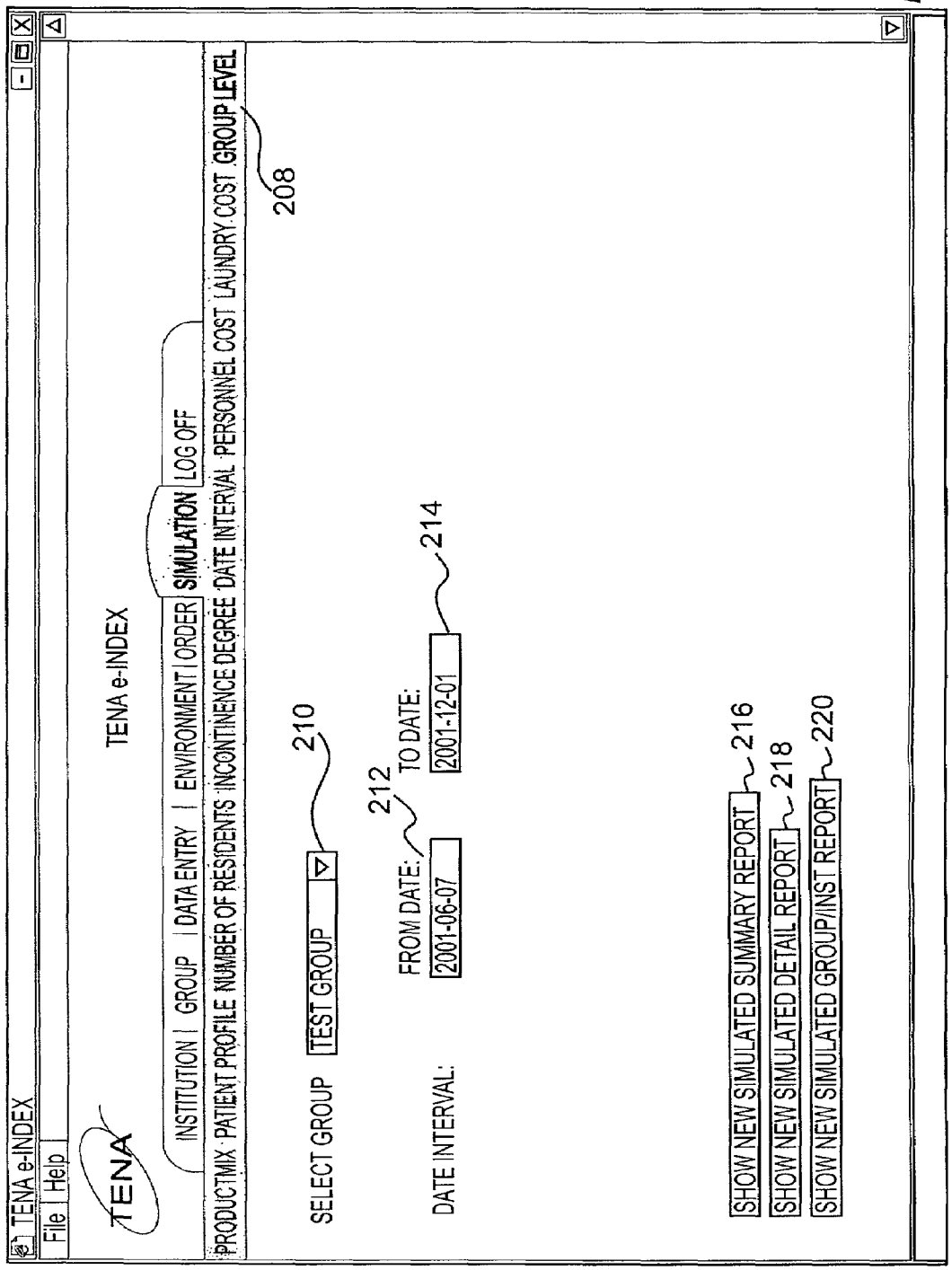
FIG. 21 illustrates a simulation group level GUI.

FIG. 21 illustrates a group level GUI. The group level GUI 208 includes a select group dropdown menu 210, and date interval modifiable fields 212 and 214. Furthermore, the group level GUI includes show new simulated summary report 216, show new simulated detail report 218 and show new simulated group/institution report 220 buttons.

Using the group level GUI 208, a user has the option of selecting from different groups by way of the group dropdown menu 210. A group is a predefined, user established, collection of hospitals or institutions. Typically, several hospitals or institutions will be grouped together if they are commonly owned or managed. Further to selecting particular groups, a user may also modify the from date and the to date using the modifiable fields 212 and 214, respectively. Once this information is set, the user has an option of selecting from any of buttons 216, 218, or 220.

FIG. 22 illustrates a simulation summary report GUI. The simulation summary report GUI 224 includes a hospital or institution indication field 222, an incontinence residents field 226, and a currency field 228. Information in field 222 is determined based upon a user selection in dropdown menu 160 (see FIGS. 14-20). Similarly, information in field 226 is determined based upon user modification in field 184 (see FIG. 16). Regarding field 228, the currency is determined from data stored in the database system; however, the currency data is modifiable (see document incorporated by reference). Most of these fields are also found in FIGS. 23-26, and for brevity description thereof will not be repeated.

The simulation summary report GUI 224 illustrated in FIG. 22 also includes an incontinence products listing 230, which includes specific products 232 listed therein. The data displayed in the products listing 230 is simulative in nature. That is, data entered by a user in the GUIs illustrated in FIGS. 14-20 directly results in the calculation/display of simulated data in the products listing 230. Therefore, the no of pcs, cost and product mix percent data, seen in the products listing 230, will change based upon user input in FIGS. 14-20.

In addition to the above, the simulation summary report GUI 224 also includes an annualized cost field 234. Similar to the products listing section 232, the annualized cost field 234 is also impacted by data entered in the GUIs illustrated in FIGS. 14-20.

FIGS. 23-24 illustrate a simulation detail report GUI. The simulation detail report GUI 236 illustrated in FIGS. 23-24 includes a detailed incontinence products listing 240 and a keyfigures field 238. Additional information is also included on the simulation detail report GUI 236, as discussed in connection with FIG. 22. Similar to the simulation summary report 224, the data in the products listing 240 and the keyfigures field 238 is simulative in nature. That is, data entered in the GUIs illustrated in FIGS. 14-20 impact the data shown in the products listing 240 and the keyfigures field 238. The only difference between the incontinence products listings (230 and 240), of FIGS. 22 and 23-24, is the amount of data shown.

FIG. 25 illustrates a simulation order proposal report GUI. The simulation order proposal report GUI 244 includes an order period dropdown menu 246 and an order proposal product listing 248. The order proposal listing 248 is a suggested product selection derived based upon data entered in FIGS. 14-21 and the order period selected in the dropdown menu 246. Therefore, using the simulation order proposal report GUI 244 it is possible to obtain a manufacturer suggest product order based upon user entered simulation data.

The GUI reports illustrated in FIG. 22-25 are displayed using buttons 166, 168, and 170, respectively (see FIGS. 14-21). The data illustrated in the reports is based upon user input simulation data and/or actual data relating to incontinence product consumption. The simulation data entered by a user is stored in the database system associated with the data entry GUI 10 of the present invention. Similarly, actual incontinence product consumption is also stored in the database system. Although the present invention is described using a single database system, a plurality of separate and distinct database systems may also be used to store data relating to the GUIs of the present invention. Moreover, the present invention is not limited to the use of database systems. In particular, storage of data relating to the present invention, and access thereof, may be accomplished using various other convention structural storage means capable of data storage and access.

Figure 26:
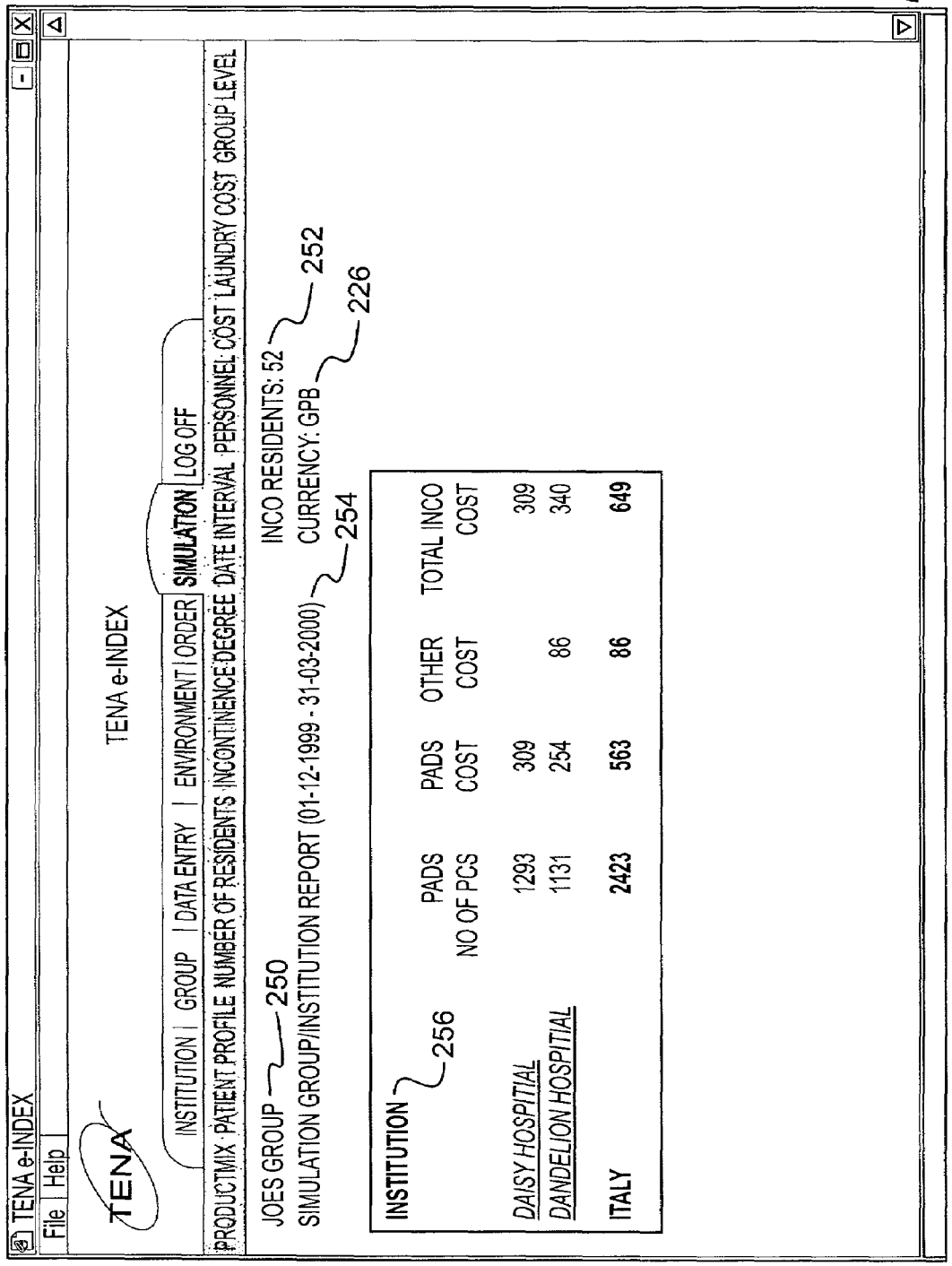
FIG. 26 illustrates a simulation group/institutional report GUI.

FIG. 26 illustrates a simulation group/institution report. The simulation group/institution report 254 includes a total incontinence residents listing 252 and a group listing 250. The report 254 also includes an institution listing 256. The report 254 is displayed using show new simulated group/institution report button 220 (FIG. 21). The institution listing 256 includes each of the hospitals or institutions that belong to the group displayed in the group listing 250. Moreover, the listing 254 includes simulated and/or actual data that relates to incontinence product use in the listed hospitals or institutions, and links (e.g. "Daisy Hospital") to simulation summary and/or detail reports pertaining to the chosen group (not illustrated). Such simulation and/or detail reports may also be shown using buttons 218 and 220 (see FIG. 21).

Figure 27:
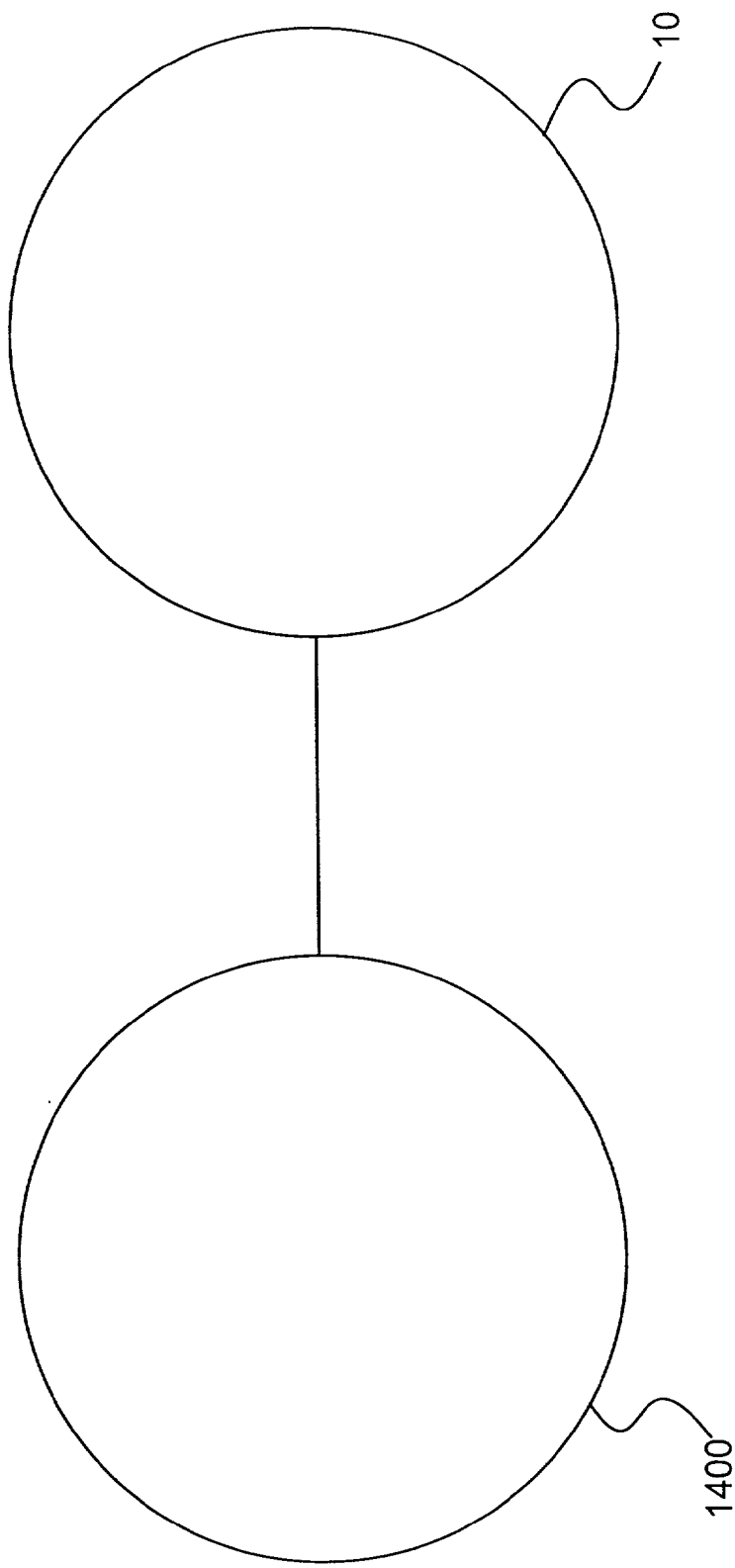
FIG. 27 illustrates a database medium connected to the data entry GUI according to the present invention.

FIG. 27 illustrates a database system connected to the data entry GUI according to the present invention. The database system 1400 is connected the data entry GUI 10 over a wire-line medium, such as coaxial cable or fiber optics. For simplicity, the computer network support between the database system 1400 and the data entry GUI 10 has not been illustrated, as such is conventional in nature and well within the purview of those having ordinary skill in the art. Moreover, although coaxial cable or fiber optics is used for communication between the database system 1400 and the data entry GUI 10, the present invention is not limited to these types of communication medium. Specially, the present invention may be implemented using other wire-line mediums, or alternatively, wireless mediums.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data entry graphical interface system for supporting data entry relating to incontinence products, comprising:
    a storage device storing information related to consumption of a plurality of incontinence products, wherein the incontinence product data includes authentic incontinence product data and inauthentic simulation incontinence product data; and
    a plurality of layered graphical user interfaces, at least one of the plurality of layered graphical user interfaces includes a list of the plurality of individual incontinence products, and the at least one of the plurality of layered graphical user interfaces is functionally capable of receiving user input relating to consumption of each of the plurality of individual incontinence products,
    wherein, based on the user input, the system is capable of determining at least one of cost per resident, change rate, number of residents using at least one of the plurality of individual incontinence products, and at least one personnel cost factor,
    wherein at least one of the plurality of graphical user interfaces is operatively interfaced with the storage device and includes incontinence product information, derived from the authentic and inauthentic incontinence product data, displayed thereon,
    wherein the system accesses the authentic and inauthentic product data to generate more than one order proposal, the order proposal including a plurality of incontinence products to be ordered, and
    wherein the system is capable of displaying at least two order proposals simultaneously on a display for comparison.

2. The data entry graphical interface system according to claim 1, wherein the user input includes one of at least a number of product boxes, bags, and miscellaneous incontinence products.

3. The data entry graphical interface system according to claim 1, wherein the at least one of the plurality of layered graphical user interfaces further includes an un-modifiable data field for displaying a total number of incontinence products consumed for each of the incontinence products listed, at least one of the incontinence products listed includes a non-zero numerical value displayed in the un-modifiable data field, and the user input includes a numerical value representative of a total number of incontinence products consumed for at least one of the products listed.

4. The data entry graphical interface system according to claim 3, wherein the at least one of the plurality of layered graphical user interfaces further includes an actuatable button, and upon actuation of the acuatable button, the non-zero numerical value and the numerical value associated with the total number of incontinence products consumed are compared.

5. The data entry graphical interface system according to claim 4, wherein if the comparison shows a deviation of a predetermined value, then an alert is displayed.

6. The data entry graphical interface system according to claim 5, wherein the predetermined value is a greater than or less than twenty percent deviation between the non-zero numerical value and the numerical value associated with the total number of incontinence products consumed.

7. The data entry graphical interface system according to claim 1, wherein the plurality of layered graphical user interfaces includes at least a data entry graphical user interface, an order graphical user interface and a simulation graphical user interface.

8. The data entry graphical interface system according to claim 7, wherein the data entry graphical user interface includes a plurality of modifiable fields, at least one modifiable field of the plurality being capable of accepting a numerical value relating to incontinence residents.

9. The data entry graphical interface system according to claim 8, wherein the plurality of modifiable fields further includes a modifiable field for choosing from a plurality of listed institutions.

10. The data entry graphical interface system according to claim 7, wherein the data entry graphical interface, order graphical interface and simulation graphical interface each includes a subset of accessible user screens.

11. The data entry graphical interface system according to claim 10, wherein the subset of accessible user screens associated with the data entry graphical interface includes consumption, budget and personal cost factors screens.

12. The data entry graphical interface system according to claim 11, wherein the consumption screen includes a listing of the plurality of individual incontinence products, and modifiable fields that accept numerical values associated with each of the plurality of individual incontinence products.

13. The data entry graphical interface system according to claim 12, wherein the consumption screen further includes an actuatable button, and at least one of the modifiable fields containing a non-zero numerical value, whereby actuation of the actuatable button updates a storage medium, the data entry graphical interface system is connected to, with the non-zero numerical value.

14. The data entry graphical interface system according to claim 13, wherein the consumption screen further includes an actuatable button for displaying an add item screen that partially overlays the consumption screen, the add item screen facilitating adding incontinence products to the listing of the plurality of individual incontinence products.

15. The data entry graphical interface system according to claim 11, wherein the budget screen includes cost and pieces user modifiable fields.

16. The data entry graphical interface system according to claim 11, wherein the personal cost factors screen includes salary per hour and minutes per change user modifiable fields.

17. The data entry graphical interface system according to claim 10, wherein the subset of accessible user screens associated with the order graphical interface includes order proposal, standing order and replenishment screens.

18. The data entry graphical interface system according to claim 17, wherein the order proposal screen includes an order proposal product listing generated by the data entry graphical user interface system from stored database data.

19. The data entry graphical interface system according to claim 17, wherein the standing order screen includes a standing order product listing generated by the data entry graphical user interface system from stored database data.

20. The data entry graphical interface system according to claim 17, wherein the replenishment screen includes a next delivery product listing generated by the data entry graphical user interface system from stored database data.

21. The data entry graphical interface system according to claim 18, wherein the order proposal screen further includes user modifiable fields associated with each of the products listed in the order proposal product listing, non-zero numerical entries in the user modifiable fields being used to update product data stored in a database associated with the data entry graphical user interface system.

22. The data entry graphical interface system according to claim 10, wherein the subset of accessible user screens associated with the simulation graphical user interface includes product mix, patient profile, number of residents, incontinence degree, date interval personnel cost laundry cost and group level screens.

23. The data entry graphical user interface system according to claim 1, further comprising a plurality of graphical user interfaces with user modifiable fields.

24. The data entry graphical interface system according to claim 1, wherein the plurality of graphical user interfaces include at least one of product mix, patient profile, number of residents, incontinence degree, date interval, personnel cost, laundry cost and group level graphical user interfaces.

25. The data entry graphical interface system according to claim 1, wherein the at least one graphical user interface is one of a simulated summary report and a simulated detail report.

* * * * *